United States Patent
Hiraga et al.

(10) Patent No.: US 10,168,817 B2
(45) Date of Patent: Jan. 1, 2019

(54) IMAGE DISPLAY APPARATUS, IMAGE DISPLAYING METHOD AND PROGRAM

(71) Applicant: MORPHO, INC, Tokyo (JP)

(72) Inventors: Masaki Hiraga, Tokyo (JP); Tomoyuki Nakano, Sumoto (JP)

(73) Assignee: MORPHO, INC., Tokyo (JP)

( * ) Notice: Subject to any disclaimer, the term of this patent is extended or adjusted under 35 U.S.C. 154(b) by 117 days.

(21) Appl. No.: 14/163,595

(22) Filed: Jan. 24, 2014

(65) Prior Publication Data

US 2014/0215365 A1    Jul. 31, 2014

(30) Foreign Application Priority Data

Jan. 25, 2013  (JP) .................................. 2013-11751

(51) Int. Cl.
*G06F 3/048*  (2013.01)
*G06F 3/041*  (2006.01)
(Continued)

(52) U.S. Cl.
CPC .......... *G06F 3/0416* (2013.01); *G06F 3/0412* (2013.01); *G06F 3/0482* (2013.01);
(Continued)

(58) Field of Classification Search
CPC .................................................... G06F 3/0482
See application file for complete search history.

(56) References Cited

U.S. PATENT DOCUMENTS 8,291,350 B1 * 10/2012 Park .................... G06F 3/04883
715/705
2003/0184525 A1 * 10/2003 Tsai .................... G06F 3/04883
345/173

(Continued)

FOREIGN PATENT DOCUMENTS

CN    102262507    11/2011
EP      2175354     4/2010
(Continued)

OTHER PUBLICATIONS

Stephen Ashby,iPhoto: How to use multi-touch gestures to control iPhoto, Oct. 18, 2012, http://www.icreatemagazine.com/tips/iphoto-use-multi-touch-gestures-to-control-iphoto/.*

(Continued)

*Primary Examiner* — Jeffrey A Gaffin
*Assistant Examiner* — Mohamed Abou El Seoud
(74) *Attorney, Agent, or Firm* — JCIPRNET

(57) ABSTRACT

(Problem) To facilitate setting of an image display style and selection of images in an image display apparatus with a touch screen.

(Solution to Problem) Thumbnails included in an area designated by a pinch gesture are all specified. If it is not true that "the thumbnails included in the designated area are all displayed in the selected style" (S2004, No), the thumbnails included in the designated area are all displayed in the selected style (S2005), and the status is set to selected state (S2006). If it is true that "the thumbnails included in the designated area are all displayed in the selected style" (S2004, Yes), the thumbnails included in the designated area are all displayed in unselected style (S2007), and the status is set to unselected state (S2008). If the gesture is continuously changed to a pinch-out gesture or a pinch-in gesture (S2010, No), the selected area or the unselected area are expanded or reduced depending on the status (S2014, S2015).

18 Claims, 22 Drawing Sheets

(51) Int. Cl.
   *G06F 3/0488* (2013.01)
   *G06F 3/0481* (2013.01)
   *G06F 3/0482* (2013.01)
   *G06F 3/0484* (2013.01)
(52) U.S. Cl.
   CPC ........ *G06F 3/0488* (2013.01); *G06F 3/04817* (2013.01); *G06F 3/04842* (2013.01); *G06F 3/04845* (2013.01); *G06F 3/04883* (2013.01); *G06F 2203/04104* (2013.01); *G06F 2203/04806* (2013.01); *G06F 2203/04808* (2013.01)

(56) References Cited

U.S. PATENT DOCUMENTS

| | | | |
|---|---|---|---|
| 2006/0025218 A1* | 2/2006 | Hotta | A63F 13/06 463/37 |
| 2006/0026535 A1 | 2/2006 | Hotelling et al. | |
| 2008/0309643 A1* | 12/2008 | Arimoto | G06F 3/04886 345/173 |
| 2009/0077488 A1* | 3/2009 | Ording | G06F 3/0485 715/784 |
| 2009/0228792 A1* | 9/2009 | van Os | G06F 3/0488 715/702 |
| 2009/0228842 A1* | 9/2009 | Westerman | G06F 3/04883 715/863 |
| 2010/0020025 A1* | 1/2010 | Lemort | G06F 3/04883 345/173 |
| 2010/0171712 A1 | 7/2010 | Cieplinski et al. | |
| 2010/0231529 A1 | 9/2010 | Tikka | |
| 2010/0245274 A1 | 9/2010 | Fukuda | |
| 2010/0283743 A1* | 11/2010 | Coddington | G06F 3/0485 345/173 |
| 2012/0030566 A1* | 2/2012 | Victor | G06F 3/0482 715/702 |
| 2012/0056836 A1* | 3/2012 | Cha | G06F 3/04842 345/173 |
| 2012/0206498 A1 | 8/2012 | Kai et al. | |
| 2013/0167062 A1* | 6/2013 | Herring | G06F 3/04883 715/773 |
| 2014/0006988 A1 | 1/2014 | Yamamura et al. | |

FOREIGN PATENT DOCUMENTS

| | | |
|---|---|---|
| JP | 2003-209771 A | 7/2003 |
| JP | 2004-152171 A | 5/2004 |
| JP | 2009-003579 A | 1/2009 |
| JP | 2010-515978 A | 5/2010 |
| JP | 2010-175738 A | 8/2010 |
| JP | 2012008666 | 1/2012 |
| JP | 2012-168790 A | 9/2012 |
| JP | 2013-541757 A | 11/2013 |
| WO | 2008/086218 A2 | 7/2008 |
| WO | 2010/044151 A1 | 4/2010 |
| WO | 2012/141048 A1 | 10/2012 |

OTHER PUBLICATIONS iPadHowToTraining, How to Copy & Paste on iPad, Mar. 1, 2012, https://www.youtube.com/watch?v=KyP-BNZD9PM , YouTube.*
Office Action dated Jul. 28, 2015, issued in counterpart application No. 2014-011384 (3 pages).
"Office Action of China Counterpart Application" , dated Aug. 31, 2016, p. 1-p. 9.
Michael MA,"Samsung Galaxy Note 2 Tips & Tricks Episode 47: Photo Gallery, Slideshow w/Music & Holiday Ideas" retrieved from the Internet : URL:http://www.youtube.com/watch?v=AROeJeAvmkg, Dec. 24, 2012.
"Search Report of European Counterpart Application," dated Mar. 12, 2018, p. 1-p. 19.

* cited by examiner

FIG. 4
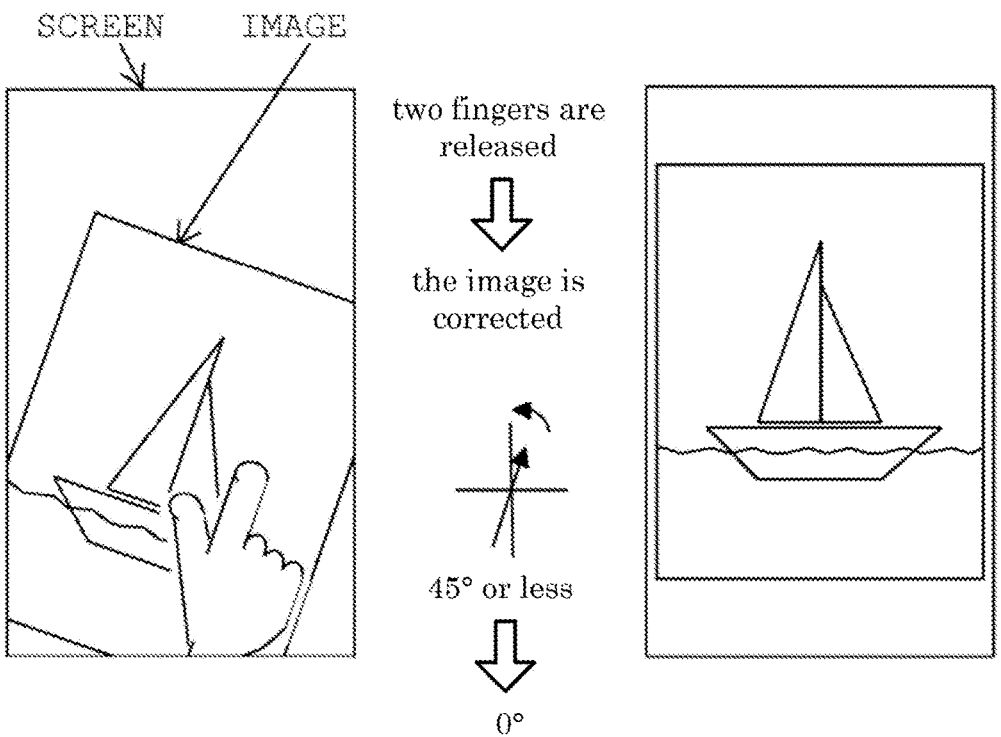
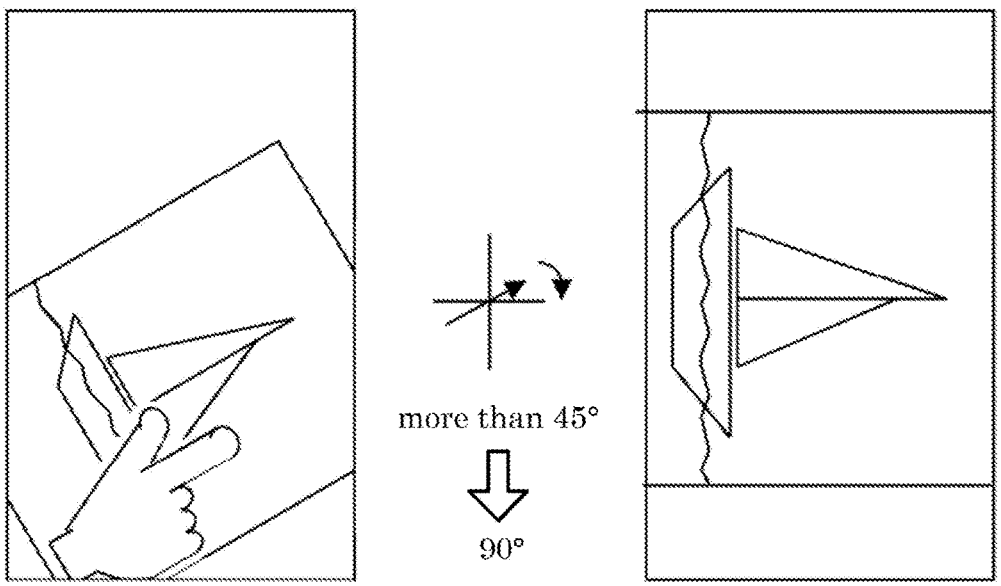

FIG. 5

(a)
$$\begin{pmatrix} \vec{q} \\ 1 \end{pmatrix} = M \begin{pmatrix} \vec{p} \\ 1 \end{pmatrix}$$

$\vec{p} : p$
$\vec{q} : q$ (b)
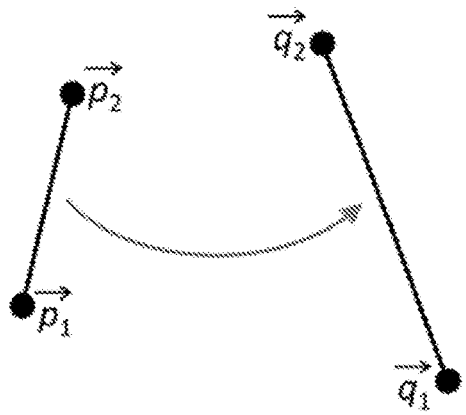

$\vec{p_1}, \vec{p_2} : p_1, p_2$
$\vec{q_1}, \vec{q_2} : q_1, q_2$ (c)
$\vec{p}_{12} = \vec{p}_2 - \vec{p}_1$
$\vec{q}_{12} = \vec{q}_2 - \vec{q}_1$ $$m = \begin{pmatrix} \dfrac{\vec{p}_{12} \cdot \vec{q}_{12}}{|\vec{p}_{12}|^2} & -\dfrac{\vec{p}_{12} \times \vec{q}_{12}}{|\vec{p}_{12}|^2} \\ \dfrac{\vec{p}_{12} \times \vec{q}_{12}}{|\vec{p}_{12}|^2} & \dfrac{\vec{p}_{12} \cdot \vec{q}_{12}}{|\vec{p}_{12}|^2} \end{pmatrix}$$

$$M = \begin{pmatrix} m & \vec{q}_1 - m\vec{p}_1 \\ 0 & 1 \end{pmatrix} = \begin{pmatrix} m & \vec{q}_2 - m\vec{p}_2 \\ 0 & 1 \end{pmatrix}$$

FIG.8
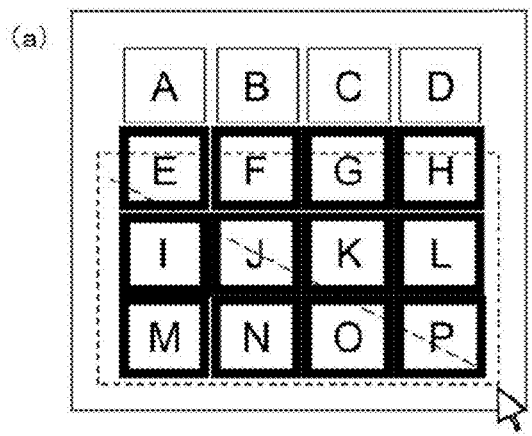
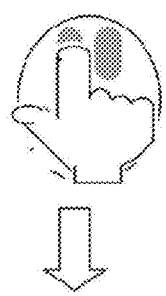
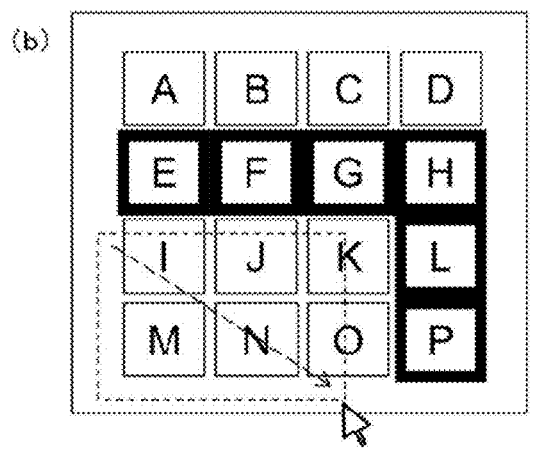
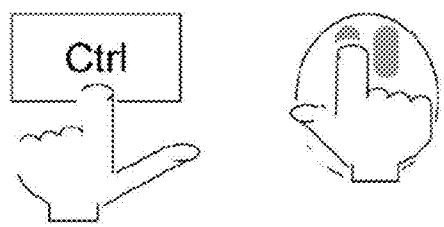

FIG.9

| OPERATION | FOR INDIVIDUAL IMAGES | FOR A PLURALITY OF IMAGES |
|---|---|---|
| SELECTION | POSSIBLE | IMPOSSIBLE |
| NON-SELECTION | POSSIBLE | IMPOSSIBLE |
| INVERSION | POSSIBLE | IMPOSSIBLE |

FIG.13
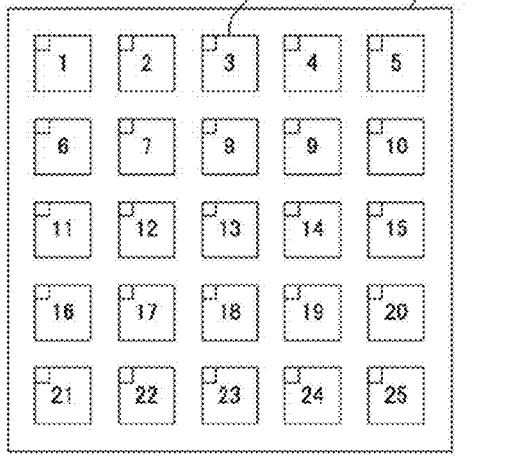
(a) INITIAL STATE OF SELECTION MODE
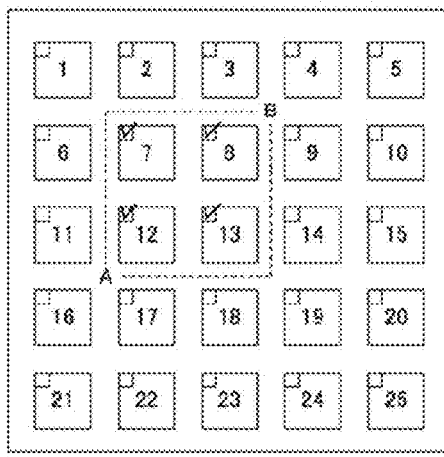
(b) AT THE TIME OF STARTING FIRST PINCH GESTURE (MULTI-TOUCH GESTURE AT A AND B)
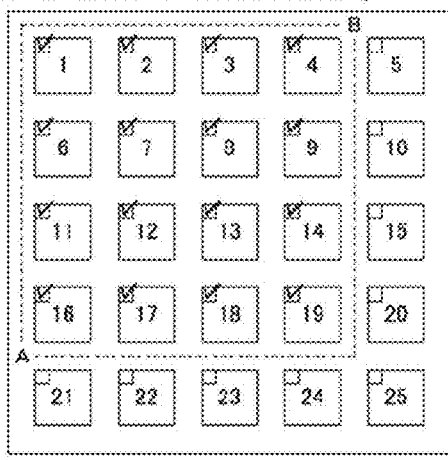
(c) PINCH OUT GESTURE (CONTINUING MULTI-TOUCH GESTURE)

FIG.14
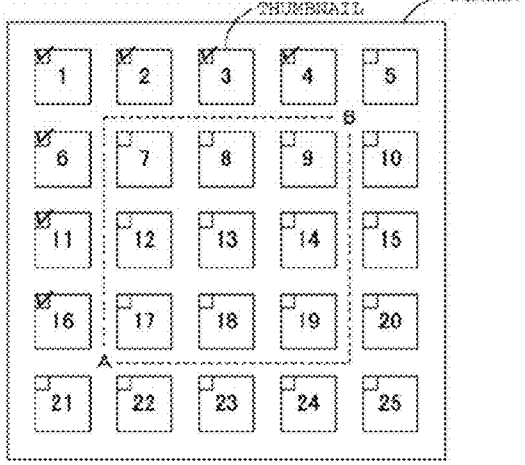
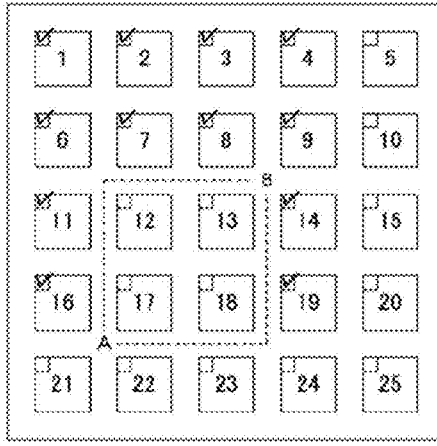
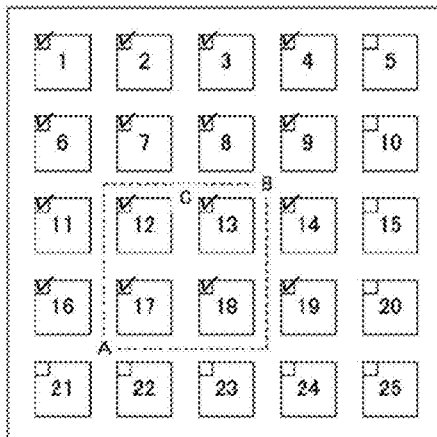

FIG.15
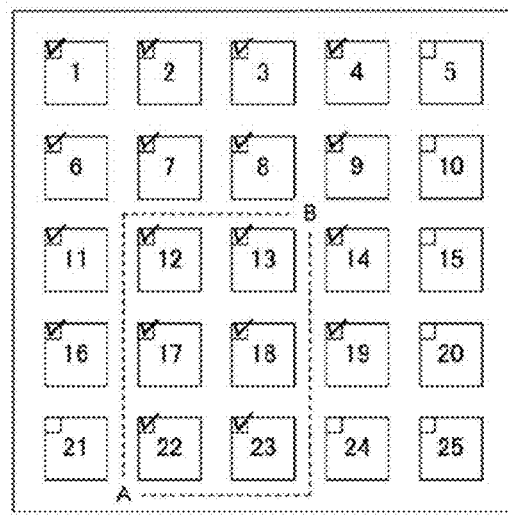
(g) EXPANSION OF INVERTED AREA (PINCH OUT GESTURE)
FIG.16
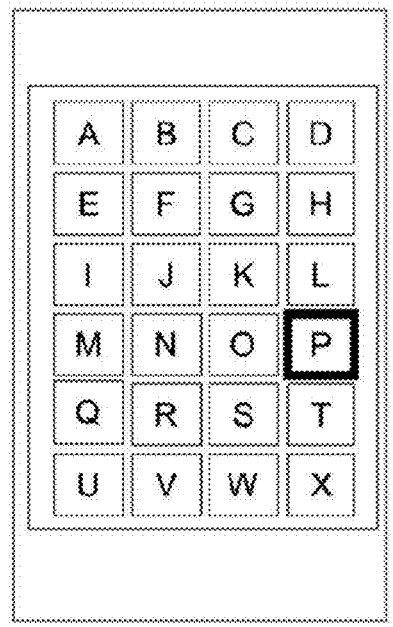
(a) n=4
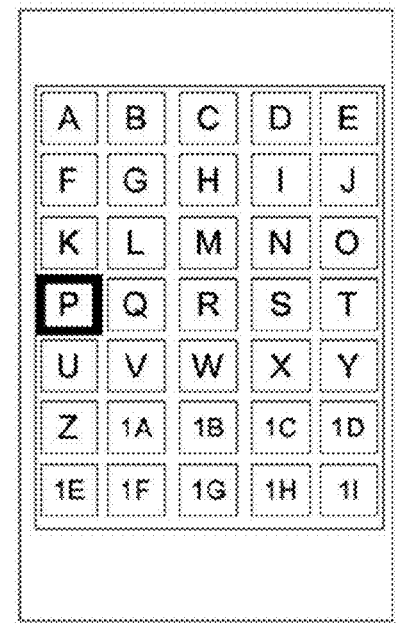
(b) n=5

IMAGE DISPLAY APPARATUS, IMAGE DISPLAYING METHOD AND PROGRAM

TECHNICAL FIELD

The present invention relates to an image display apparatus with a touch screen, and an image displaying method and a program implemented in the image display apparatus.

BACKGROUND ART

Operations of an image display apparatus such as browsing, selection of images and the like have long been conventionally performed through input devices such as mouse and keyboard. These days, however, such operations are performable using a touch screen. For example, Patent Literature 1 discloses a collection of gestures that are compatible with the features of a touch screen.

CITATION LIST

Patent Literature

Patent Literature 1: JP 2010-515978A

SUMMARY OF INVENTION

Technical Problem

Image display apparatuses with a touch screen, such as smartphones and tablets, are capable of performing the desired processes by the user by means of intuitively performable actions such as a tap gesture and a pinch gesture. On the other hand, compared to inputting with a mouse or keyboard, etc., the problem with such touch screen control is the difficulty and limitation of detailed setting and selection, in terms of setting an image display mode or selecting an image, for example.

The present invention is to provide an image display apparatus by which the above-described problem is solved.

Solution to Problem

In order to solve the problem above, the following means are employed. In the following description, reference signs in parentheses are used in the description of embodiments and the drawings described below. However, the components of the present invention are not intended to be limited to those represented by the reference signs.

The invention according to Means 1 is:

an image display apparatus (100) that displays a plurality of items (thumbnails) in a list form on a touch screen, wherein a selection display process or a non-selection display process is performed on an target item that is included in a designated area among the plurality of items, wherein the designated area is determined based on two coordinates (a rectangle whose diagonal connects the two coordinates) designated by a designating operation (pinch gesture) on the touch screen, the selection display process is to display all of the target item in a selected style (the process of step S2005, which is performed if it is not true that "the target thumbnails are all displayed in selected style"), and the non-selection display process is to display all of the target item in an unselected style (the process of step S2007, which is performed if it is true that "the target thumbnails are all displayed in selected style"), in response to change of the coordinates of the designating operation after the selection display process is performed, the selection display process is performed again on the target item included in the designated area that is determined based on the changed coordinates (if the two coordinates moves according to a pinch-out gesture or a pinch-in gesture without the pinch gesture being released, and if the status is selected status, the step S2014 is performed to expand or reduce the designated area), and in response to change of the coordinates of the designating operation after the non-selection display process is performed, the non-selection display process is performed again on the target item included in the designated area that is determined based on the changed coordinates (if the two coordinates moves according to a pinch-out gesture or a pinch-in gesture without the pinch gesture being released, and if the status is unselected status, the step S2015 is performed to expand or reduce the designated area).

By the invention according to Means 1, it is possible to set target thumbnails in detail.

The invention according to Means 2 is:

the image display apparatus according to Means 1, wherein with respect to the item that is displayed in selected style at the time the designating operation is released, said item remains displayed in the selected style until said item becomes a target of the non-selection display process according to another designating operation (even after the first pinch gesture is released, the thumbnails remain displayed in selected style until they become targets of the non-selection display process according to the second pinch operation), and with respect to the item that is displayed in the unselected style at the time the designating operation is released, said item remains displayed in the unselected style until said item becomes a target of the selection display process according to another designating operation (even after the first pinch gesture is released, the thumbnails remain displayed in unselected style until they become targets of the selection display process according to the second pinch operation).

By the invention according to Means 2, it is possible to set target thumbnails in detail by designating operations for plural times.

The invention according to Means 3 is:

the image display apparatus according to Means 1 or 2, wherein after the selection display process or the non-selection display process is performed, in response to further detecting a predetermined inversion operation without the designating operation of the selection display process or the non-selection display process being released (after the process of step S2005 or S2014 or the process of step S2007 or S2015 is performed, if a tap is detected in step S2020 without the pinch operation being released (continuing the multi-touch gesture)), a non-selection inversion process or a selection inversion process is performed on the target item included in the designated area that is determined based on the two coordinates designated by the designating operation, wherein if the target item is displayed in the selected style, the non-selection inversion process is performed to change the target item into the unselected style (the thumbnails displayed in selected style are changed into the unselected style in step S2021, and the status is changed to unselected status in step S2023), and if the target item is displayed in the unselected style, the selection inversion process is performed to change the target item into the selected style (the thumbnails displayed in unselected style are changed into selected style in step S2021, and the status is changed to selected status in step S2024).

By the invention according to Means 3, it is possible to readily invert the display style of the thumbnail to which the selection display process of non-selection display process has been once performed.

The invention according to Means 4 is:

the image display apparatus according to Means 3, wherein in response to change of the coordinates of the designating operation after the non-selection inversion process is performed, the non-selection display process is performed on the target display item included in the designated area that is determined based on the changed coordinates (after the non-selection inversion process is performed in step S2021, if the coordinates of the two points are changed according to a pinch-out gesture, a pinch-in gesture or the like without the pinch gesture being released, step S2015 is performed based on the unselected status to expand or reduce the inverted area), wherein in response to change of the coordinates of the designating operation after the selection inversion process is performed, the selection display process is performed on the target display item included in the designated area that is determined based on the changed coordinates (after the selection inversion process is performed in step S2021, if the coordinates of the two points are changed according to a pinch-out gesture, a pinch-in gesture or the like without the pinch gesture being released, step S2014 is performed based on the selected status to expand or reduce the inverted area), By the invention according to Means 4, it is possible to readily expand or reduce the inverted area.

The invention according to Means 5 is: the image display apparatus according to any one of Means 1 to 4, wherein the plurality of items include a plurality of thumbnails, there are a selection mode and a non-selection mode as to a state where the plurality of thumbnails are displayed in the list form, the selection display process and the non-selection display process according to the designating operation are enabled in the selection mode, a zooming-in/out of the thumbnail according to a predetermined zoom-in/out operation is enabled in the non-selection mode, the designating operation and the zoom-in/out operation include a pinch gesture by which two points are designated on the touch screen, and the selection mode and the non-selection mode are switchable to each other according to a predetermined switching operation (a long tap at any one point or any two points).

By the invention according to Means 5, it is possible to select the target thumbnails as well as to perform the zooming-in/out of the thumbnail list through a common operation of an ordinary pinch gesture by suitably switching the mode between the selection mode and the non-selection mode.

The invention according to Means 6 is:

the image display apparatus according to Means 5, wherein the switching operation includes a long tap at two points on the touch screen for a predetermined period or more of time (a multi-touch gesture for 0.6 seconds or more), and after transition to the selection mode according to the long tap, all thumbnails included in the designated area is displayed in the selected style, wherein the designated area is determined based on coordinates of the two points of the switching operation (all of the thumbnails included in the rectangle whose diagonal connects two points designated by the long tap gesture are displayed in selected style).

By the invention according to Means 6, it is possible to omit an operation for displaying the thumbnails in selected style after transition to the selection mode.

The invention according to Means 7 is:

an image displaying method, including the steps of:

performing a selection display process or a non-selection display process on an target item that is included in a designated area among a plurality of items displayed in a list form on a touch screen, wherein the designated area is determined based on two coordinates (a rectangle whose diagonal connects the two coordinates) designated by a designating operation (pinch gesture) on the touch screen, the selection display process is to display all of the target item in a selected style (the process of step S2005, which is performed if it is not true that "the target thumbnails are all displayed in selected style"), and the non-selection display process is to display all of the target item in an unselected style (the process of step S2007, which is performed if it is true that "the target thumbnails are all displayed in selected style"), in response to change of the coordinates of the designating operation after the selection display process is performed, performing the selection display process again on the target item included in the designated area that is determined based on the changed coordinates (if the two coordinates move according to a pinch-out gesture or a pinch-in gesture without the pinch gesture being released, and if the status is selected status, the step S2014 is performed to expand or reduce the designated area), and in response to change of the coordinates of the designating operation after the non-selection display process is performed, performing the non-selection display process again on the target item included in the designated area that is determined based on the changed coordinates (if the two coordinates moves according to a pinch-out gesture or a pinch-in gesture without the pinch gesture being released, and if the status is unselected status, the step S2015 is performed to expand or reduce the designated area).

By the invention according to Means 7, it is possible to set target thumbnails in detail.

The invention according to Means 8 is:

a program, including the steps of:

performing a selection display process or a non-selection display process on an target item that is included in a designated area among a plurality of items displayed in a list form on a touch screen, wherein the designated area is determined based on two coordinates (a rectangle whose diagonal connects the two coordinates) designated by a designating operation (pinch gesture) on the touch screen, the selection display process is to display all of the target item in a selected style (the process of step S2005, which is performed if it is not true that "the target thumbnails are all displayed in selected style"), and the non-selection display process is to display all of the target item in an unselected style (the process of step S2007, which is performed if it is true that "the target thumbnails are all displayed in selected style"), in response to change of the coordinates of the designating operation after the selection display process is performed, performing the selection display process again on the target item included in the designated area that is determined based on the changed coordinates (if the two coordinates moves according to a pinch-out gesture or a pinch-in gesture without the pinch gesture being released, and if the status is selected status, the step S2014 is performed to expand or reduce the designated area), and in response to change of the coordinates of the designating operation after the non-selection display process is performed, performing the non-selection display process again on the target item included in the designated area that is determined based on the changed coordinates (if the two coordinates moves according to a pinch-out gesture or a pinch-in gesture without the pinch gesture being released, and if the status is unselected status, the step S2015 is performed to expand or reduce the designated area).

By the invention according to Means 8, it is possible to set target thumbnails in detail.

The invention according to Means 9 is:

an image display apparatus (100) with a touch screen that displays a display image at a rotation angle according to a rotating operation on the touch screen (an angle between the line connecting designated two points before the rotating operation and the line connecting designated two points after the rotating operation), wherein after the rotating operation is released (if the determination in step 1003 is "No" since the user is not in contact with the touch screen), a rotation angle convergence process is performed to converge the rotation angle of the image to a predetermined fixed angle (the convergence angle is set to a certain value in steps 31031, S1033, S1035 and S1037, and the display image is converged at the set convergence angle in step S1040).

By the invention according to Means 9, it is possible to readily display an image at an appropriate angle.

The invention according to Means 10 is:

the image display apparatus according to Means 9, wherein the fixed angle includes 0°, 90°, 180° and 270°, and in the rotation angle convergence process, the rotation angle is converged to the closest fixed angle at the time the rotating operation is released (the convergence angle is set to any of the fixed angle in steps S1031, S1033, S1035 and S1037, and the rotation angle is converged to the set convergence angle in step S1040).

By the invention according to Means 10, it is possible to readily display an image at an appropriate angle.

The invention according to Means 11 is:

the image display apparatus according to Means 10, wherein when the image is converged at the predetermined fixed angle by the rotation angle convergence process, information that specifies said fixed angle is stored as meta-data of the image (a value designating the rotation angle is stored as an orientation tag of EXIF).

By the invention according to Means 11, it is possible to omit an operation for displaying the same image at an appropriate angle when displaying it again.

The invention according to Means 12 is:

the image display apparatus according to Means 11, wherein the information is stored as an orientation tag of EXIF (exchangeable image file format).

By the invention according to Means 12, it is possible to omit an operation for displaying the same image at an appropriate angle when displaying it again.

The invention according to Means 13 is:

the image display apparatus according to any one of Means 9 to 12, wherein the display image is zoomed-in/out according to a zoom-in/out operation on the touch screen (a pinch-out gesture or a pinch-in gesture), and after the zoom-in/out operation is released, a display magnification convergence process is performed so that a display magnification of the display image is converged at a predetermined fixed magnification (the display magnification is set to a certain value in step S1021, and the image is converged at the display magnification in step S1040).

By the invention according to Means 13, it is possible to readily display the display image at an appropriate magnification.

The invention according to Means 14 is:

the image display apparatus according to any one of Means 9 to 12, wherein the display image is parallelly shifted according to a parallel shifting operation on the touch screen (a pinch gesture), and after the parallel shifting operation is released, a display position convergence process is performed so that a display position of the display image is converged at a predetermined fixed position (the display position is set at step S1011).

By the invention according to Means 14, it is possible to readily display the display image at an appropriate position.

The invention according to Means 15 is:

the image display apparatus according to any one of Means 9 to 12, wherein the display image is rotated, zoomed-in/out or parallelly shifted according to a pinch gesture by which two points are designated on the touch screen, in response to change from the pinch gesture to a touch gesture by which one point is designated on the touch screen (one of the two contact points of the pinch gesture is maintained while the other contact point is released (if the pinch gesture is successively changed to a touch gesture)), parallel shifting of the display image is enabled while the rotation angle and the display magnification of the display image are retained (the display image is only parallelly shifted according to change of the coordinate of the remaining one contact point while the rotation angle and the display magnification of the display image are not changed).

By the invention according to Means 15, it is possible to change only the display position of the display image with displaying the display image at the desired angle and desired magnification. Furthermore, this is advantageous in that the whole display image is more viewable because the fingers of the pinch gesture do not interrupt the view.

The invention according to Means 16 is:

the image display apparatus according to Means 15, wherein in response to release of the touch gesture, the rotation angle convergence process is performed so that the rotation angle of the display image is converged at a predetermined fixed angle (if any contact on the touch screen is released so that the operation is completely released, the convergence angle is set at steps S1031, S1033, S1035 and S1037, and the display image is converged at the set convergence angle in step S1040).

By the invention according to Means 16, it is possible to readily display the display image at an appropriate angle.

The invention according to Means 17 is:

the image display apparatus according to Means 15, wherein in response to release of the touch gesture, a display magnification convergence process is performed so that a display magnification of the display image is converged at a predetermined fixed magnification (if any contact on the touch screen is released so that the operation is completely released, the convergence display magnification is set at step S1021, and the display image is converged at the set convergence magnification in step S1040).

By the invention according to Means 17, it is possible to readily display the display image at an appropriate magnification.

The invention according to Means 18 is:

the image display apparatus according to Means 15, wherein in response to release of the touch gesture, a display position convergence process is performed so that a display position of the display image is converged at a predetermined fixed position (if any contact on the touch screen is released so that the operation is completely released, the convergence display position is set at step S1011, and the display image is converged at the set convergence position in step S1040).

By the invention according to Means 18, it is possible to readily display the display image at an appropriate position.

The invention according to Means 19 is:

the image display apparatus according to any one of Means 16 to 18, wherein in response to change from the touch gesture back to the pinch gesture, rotation, zooming-in/out and parallel shifting of the display image are enabled (if another contact point is detected while the one contact point of the touch gesture is maintained so that the gesture is changed to a multi-touch gesture (if the touch gesture is successively changed to the pinch gesture), rotation, zooming-in/out and parallel shifting of the display image according to the pinch gesture are enabled again).

By the invention according to Means 19, it is possible to change the display angle and display magnification again after the display angle and display magnification of the display image are once set and then the display image is parallelly shifted.

The invention according to Means 20 is:

an image displaying method, comprising the steps of:

rotating an display image at a rotation angle according to a rotating operation on the touch screen (an angle between the line connecting designated two points before the rotating operation and the line connecting designated two points after the rotating operation), wherein after the rotating operation is released (if the determination in step 1003 is "No" since the user is not in contact with the touch screen), converging the rotation angle of the display image at a predetermined fixed angle (the convergence angle is set to a certain value in steps S1031, S1033, S1035 and S1037, and the display image is converged at the set convergence angle in step S1040).

By the invention according to Means 20, it is possible to readily display the display image at an appropriate angle.

The invention according to Means 21 is:

a program, comprising the steps of:

rotating an display image at a rotation angle according to a rotating operation on the touch screen (an angle between the line connecting designated two points before the rotating operation and the line connecting designated two points after the rotating operation), wherein after the rotating operation is released (if the determination in step 1003 is "No" since the user is not in contact with the touch screen), converging the rotation angle of the display image at a predetermined fixed angle (the convergence angle is set to a certain value in steps S1031, S1033, S1035 and S1037, and the display image is converged at the set convergence angle in step S1040).

By the invention according to Means 21, it is possible to readily display the display image at an appropriate angle.

The invention according to Means 22 is:

an image display apparatus (100) for displaying a plurality of items (thumbnails) on a touch screen in a list form, wherein the plurality of items in the list form are continuously zoomed-in/out according to a zoom-in/out operation on the touch screen (the whole of a plurality of items displayed in a list form are zoomed-in/out according to a pinch-out gesture or a pinch-in gesture), and relative position among the plurality of items displayed in the list form is retained while the zoom-in/out operation is being performed (relative position among the zoomed-in/out items are retained), and change of the relative position among the plurality of items is enabled so that the display items are rearranged to a predetermined position when the zoom-in/out operation is complete or has not been performed for a predetermined period or more (if the pinch gesture is released in step S3010, the items are rearranged to a predetermined position in step S3011).

By the invention according to Means 22, since the relative position among the items in the list form is retained at least up to when the zoom-in/out operation is released, it is possible to prevent a user from losing sight of a desired item during the zooming-in/out process, and also to provide a sensuously smooth interface.

The invention according to Means 23 is:

the image display apparatus according to Means 22, wherein the predetermined position is determined based on relationship between a size of each of the zoomed-in/out plurality of items and a size of a display area on which the plurality of items are displayable in the list form (the display position of each thumbnail is set so that a vacant space of the display area is shorter than one thumbnail in the width direction, and the displayed thumbnails are not off the display area in the width direction).

By the invention according to Means 23, it is possible to effectively utilize the display area to display the whole items in a viewable manner.

The invention according to Means 24 is:

the image display apparatus according to Means 23, wherein movement of the rearrangement of the zoomed-in/out items to the predetermined position is displayed in a visually recognizable manner when the zoom-in/out operation is complete or has not been performed for the predetermined period or more (the rearrangement is displayed by animation).

By the invention according to Means 24, since the user can readily figure out the rearrangement of movement of the zoomed-in/out items to the predetermined position, it is possible to prevent the user from losing a desired item.

The invention according to Means 25 is:

the image display apparatus according to any one of Means 22 to 24, wherein in response to detecting the zoom-in/out operation (if a multi-touch gesture is detected), items among the plurality of items that are located around a coordinate with respect to the zoom-in/out operation are displayed in a distinguishable style (the thumbnails located at the designated two points are overlaid with different colors from each other, and the thumbnails displayed around each of these thumbnails are overlaid with a similar color), and the distinguishable style is retained at least up to when the zoom-in/out operation is complete or has not been performed for the predetermined period or more and the plurality of items are rearranged to the predetermined position (even after the pinch gesture has been released and the items have been rearranged to a predetermined position, the overlay is displayed for a predetermined period of time).

By the invention according to Means 25, since the user can readily find the destination of a desired item that is located around the area to be zoomed-in/out, it is possible to prevent the user to lose sight of the desired item.

The invention according to Means 26 is:

the image display apparatus according to any one of Means 22 to 24, wherein in response to detecting the zoom-in/out operation (if a multi-touch gesture is detected), either group of the display items that will be displayed after zooming-in/out or the display items that will not be displayed after zooming-in/out is displayed in an distinguishable style (the thumbnail that will not be displayed if one-level zooming-in is performed so that the number of thumbnails in the width direction of the display area is reduced by one are displayed with a 50% lower brightness).

By the invention according to Means 26, the user can find which item will be or will not be displayed if a zooming-in/out is performed, and thereby can appropriately decide whether to continue the zoom-in/out operation.

The invention according to Means 27 is:

the image display apparatus according to any one of Means 22 to 24, wherein the plurality of items includes thumbnails, there are a selection mode and a non-selection mode of a state where the thumbnails are displayed in the list form, wherein selection of target thumbnails of certain processing (deletion or attachment to an e-mail) from the thumbnails according to a designating operation on the touch screen is enabled in the selection mode, zooming-in/out of the thumbnails according to the zoom-in/out operation is enabled in the non-selection mode, the designating operation and the zoom-in/out operation include a pinch gesture by which two points are designated on the touch screen, and the selection mode and the non-selection mode are switchable to each other according to a predetermined switching operation (a long tap at any one point or a long tap at any two points).

By the invention according to Means 27, it is possible to select the target thumbnails of a desired processing as well as to perform the zooming-in/out of the thumbnail list through a common operation of an ordinary pinch gesture by suitably switching the mode between the selection mode and the non-selection mode.

The invention according to Means 28 is:

the image display apparatus according to Means 27, wherein the switching operation includes a long tap at two points on the touch screen for a predetermined period or more of time (a multi-touch gesture for 0.6 second or more), and after transition to the selection mode according to the long tap, all thumbnails included in the designated area are displayed in the selected style, wherein the designated area is determined based on coordinates of the two points of the switching operation (all of the thumbnails included in the rectangle whose diagonal connects two points designated by the long tap gesture are displayed in selected style).

By the invention according to Means 28, it is possible to omit an operation for displaying the thumbnails in selected style after transition to the selection mode.

The invention according to Means 29 is:

an image displaying method, comprising the steps of:

continuously zooming-in/out a plurality of items (thumbnails) displayed on a touch screen in a list form according to a zoom-in/out operation on the touch screen (the whole of a plurality of items displayed in a list form are zoomed-in/out according to a pinch-out gesture or a pinch-in gesture) and;

retaining relative position among the plurality of items displayed in the list form while the zoom-in/out operation is being performed (relative position among the zoomed-in/out items are retained), and enabling change of the relative position among the plurality of items so that the plurality of items are rearranged to a predetermined position when the zoom-in/out operation is complete or has not been performed for a predetermined period or more (if the pinch gesture is released in step S3010, the items are rearranged to a predetermined position in step S3011).

By the invention according to Means 29 since the relative position among the plurality of items in a list form is retained at least up to when the zoom-in/out operation is released, it is possible to prevent a user from losing sight of a desired item during the zooming-in/out process, and also to provide a sensuously smooth interface.

The invention according to Means 30 is:

a program, comprising the steps of:

continuously zooming-in/out a plurality of items (thumbnails) displayed on a touch screen in a list form according to a zoom-in/out operation on the touch screen (the whole of a plurality of items displayed in a list form are zoomed-in/out according to a pinch-out gesture or a pinch-in gesture) and;

retaining relative position among the plurality of items displayed in the list form while the zoom-in/out operation is being performed (relative position among the zoomed-in/out items are retained), and enabling change of the relative position among the plurality of items so that the plurality of items are rearranged to a predetermined position when the zoom-in/out operation is complete or has not been performed for a predetermined period or more (if the pinch gesture is released in step S3010, the items are rearranged to a predetermined position in step S3011).

By the invention according to Means 30, since the relative position among the plurality of items in a list form is retained at least up to when the zoom-in/out operation is released, it is possible to prevent a user from losing sight of a desired item during the zooming-in/out process, and also to provide a sensuously smooth interface.

Advantageous Effect of Invention

According to the present invention, it is possible to readily perform detailed setting and selection on image display apparatuses with a touch screen in terms of setting an image display mode, selecting an image or the like.

BRIEF DESCRIPTION OF DRAWINGS

FIG. 4 is a view illustrating views displayed on the touch screen of the image display apparatus according to the first embodiment, upon a rotation operation on the touch screen.

FIGS. 5a to 5c are explanatory views illustrating an image converting manner according to a pinch gesture.

FIGS. 8a and 8b are views for describing a conventional operation embodiment of a PC.

FIG. 9 is a view for describing a conventional operation in an image display apparatus with a touch screen.

FIGS. 13a to 13c are views for describing a specific example of the operation according to the second embodiment.

FIGS. 14d to 14f are views for describing a specific example of the operation according to the second embodiment.

FIG. 15g is a view for describing a specific example of the operation according to the second embodiment.

FIGS. 16a and 16b are views for describing a conventional operation embodiment of an image display apparatus.

DESCRIPTION OF EMBODIMENTS

Hereinafter, embodiments of the present invention will be described with reference to the appended drawings. The same components are designated by the same reference signs, and the descriptions thereof may be omitted. Further, the dimensions of the drawings do not always correspond to the description.

(First Comparative Example)

Figure 1:
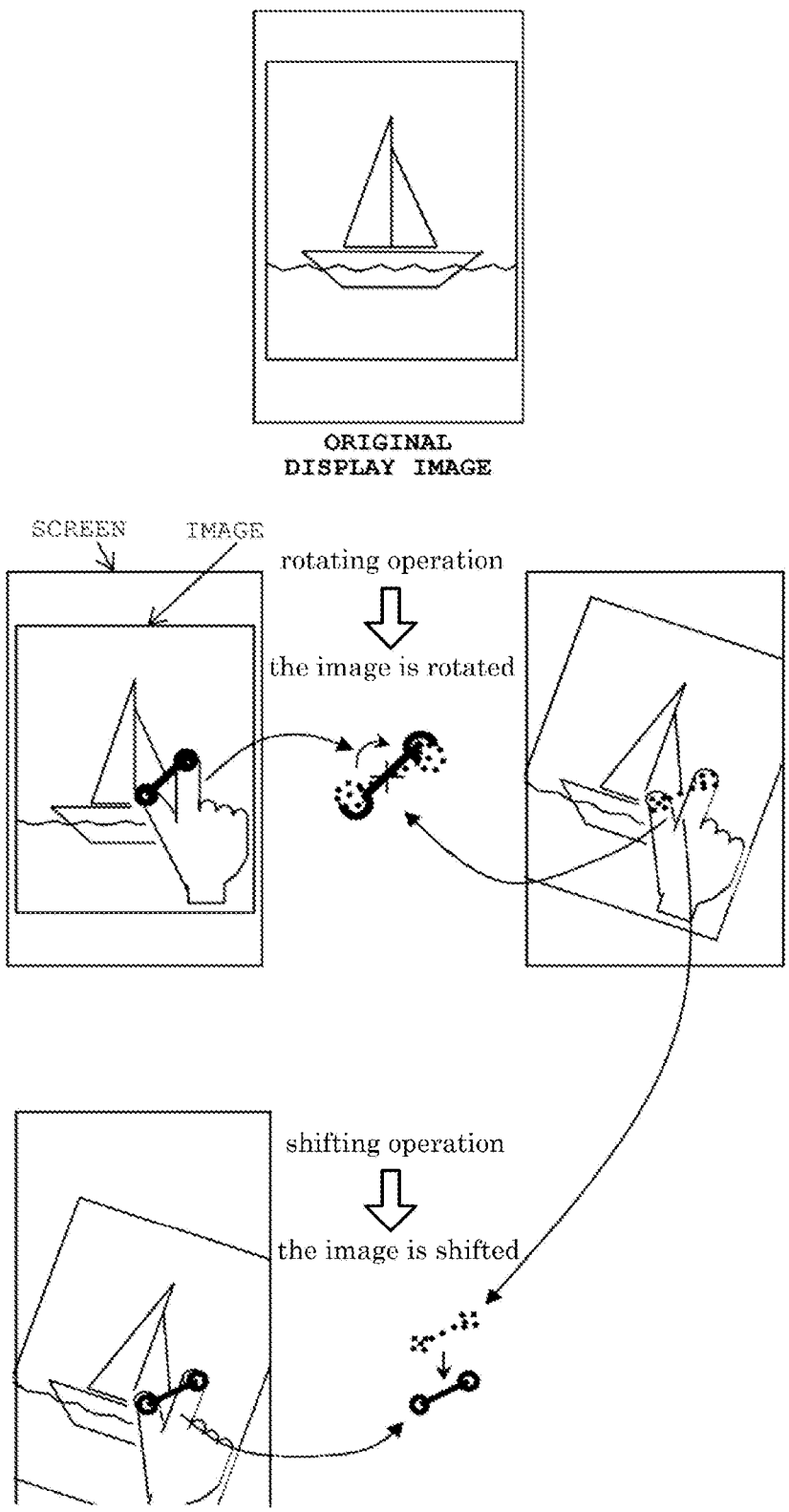
FIG. 1 is a view for describing a conventional operation embodiment of an image display apparatus.
Figure 2:
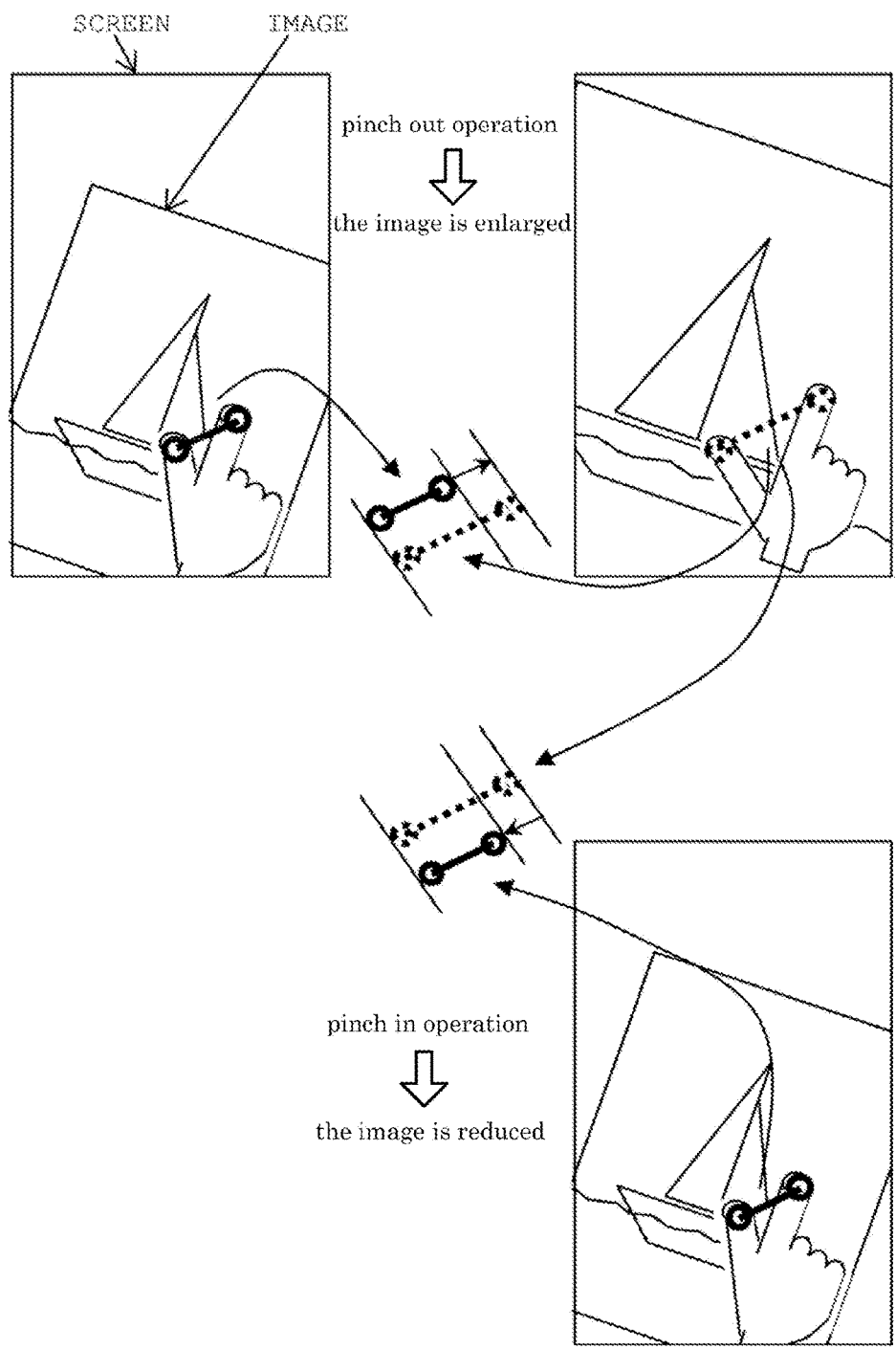
FIG. 2 is a view for describing a conventional operation embodiment of an image display apparatus.

First, a conventionally-used operation embodiment known in the art will be described as a first comparative example. Some conventionally-known image display apparatuses with a touch screen, such as smartphones and tablets, can zoom-in/out, parallel shift (pan) or rotate a display image according to predetermined operations when browsing images. In the comparative example illustrated in FIGS. 1 and 2, the desired processing can be performed on an image displayed on the image display apparatus by means of a predetermined operation where a user touches the image on the touch screen area as if he/she were physically handling the image. Specifically, while two fingers are in contact with the touch screen area where the image is displayed (i.e. during the so-called multi-touch gesture), a user can simply slide the two fingers to parallelly shift the image, expand the distance between the two fingers (the so-called pinch-out gesture) to zoom-in the image, draw the fingers closer together (the so-called pinch-in gesture) to zoom-out the image, and change the angle (rotation angle) of the line connecting the two fingers with respect to a reference line (e.g. the longitudinal direction of the image display apparatus) to rotate the image. In the following description, the term "pinch gesture" refers to a gesture of touching a touch screen with two fingers as well as gestures made with the two fingers in contact with the touch screen. Further, a gesture with one finger in contact with a touch screen is referred to as "touch gesture".

There is a need for apparatuses that can store the rotation angle set by a user who performs an operation for setting the rotation angle of the image, as described above, and can display the same image at the set rotation angle upon repeat viewing. However, in order to achieve such functions, the rotation angle must be stored in addition to the image data, such as pixel values. When the same image is displayed again, the rotation angle can be referred to so as to apply it to the image in order to set the display angle. For example, upon changing the display angle of an image (e.g. clockwise rotation of 90°, 180° or 270°) using an image viewer or the like on a PC (personal computer) equipped with an input device such as keyboard and mouse, the set rotation angle is written as the meta-data of the image by saving the image to be overwritten. When the same image is displayed again, the rotation angle of its meta-data is applied to the display image. In order to adjust the display angle using such input devices, a user can directly input a rotation angle on an input device, select a rotation angle (clockwise rotation of 90°, 180° or 270°) from a pull-down menu or the like, or click one of the icons (which indicate a half-turn, a 90° right-rotation, or a 90° left-rotation), etc. In this way, the user can readily set a display angle.

However, with a touch screen display, it is difficult to precisely rotate a display image by a desired angle (e.g. clockwise rotation of 90°, 180° or 270°) using only the above-described pinch gesture. Furthermore, the problem with apparatuses that have functions for storing rotation angle settings and displaying the same image at the stored rotation angle upon repeat viewing is the complexity of operation of such apparatuses. These problems are solved by the following image display apparatus, image displaying method and program according to a first embodiment.

(First Embodiment)

Figure 3:
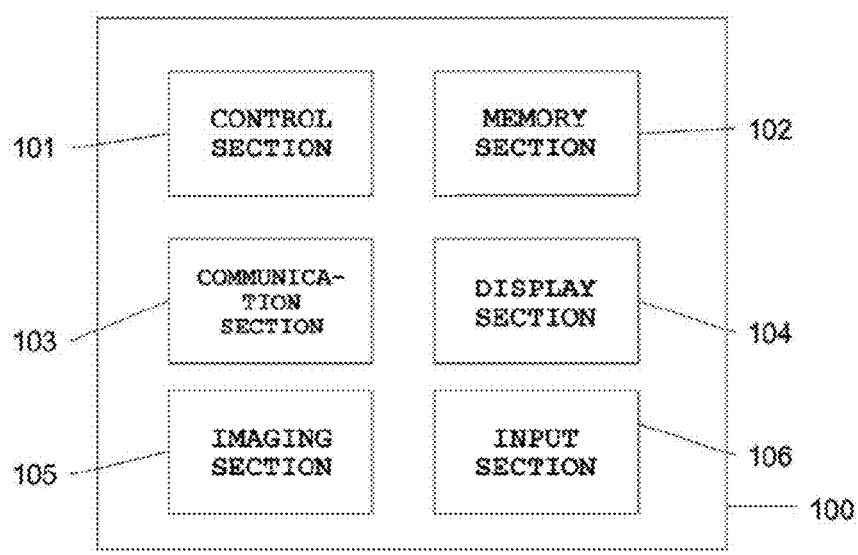
FIG. 3 is a hardware configuration diagram of an image display apparatus according to the first embodiment.

FIG. 3 is a hardware configuration view of an image display apparatus 100 according to the present invention. As illustrated in FIG. 3, the image display apparatus 100 includes a control section 101 composed of a CPU (central processing unit) and the like, a memory section 102 composed of a memory, a hard disk device and the like, a communication section 103, a display section 104, an imaging section 105 and an input section 106. The image display apparatus 100 is configured so that the control section 101 executing programs stored in the memory section 102 implements the functions described below. That is, the control section 101 is capable of executing the programs stored in the memory section 102. The memory section 102, which includes the memory, hard disk device and the like, as described above, stores the above-described programs that are to be executed by the control section 101. The memory section 102 is also capable of storing image data taken by the imaging section 105, image data retrieved from the Internet or the like through the communication section 103 and data (e.g. thumbnails) generated by the control section 101 as a result of using the programs to process these image data. The communication section 103 is configured such that the image display apparatus 100 can communicate with other apparatuses (servers, etc.) through the Internet or the like. The display section 104 is configured to display image data stored in the memory section 102, and the like. The imaging section 105 is capable of photographing and generating images. The images generated by the imaging section 105 are stored in the memory section 102 in the form of image data. The input section 106 is integrally formed with the display section 104 to provide the so-called touch screen, and serves as an interface between a user and the image display apparatus 100. Specifically, processings are carried out on items displayed on the display section 104 when a user performs a gesture such as tap and pinch on the input section 106 with his/her fingers, as if he/she were physically handling the items. The input section 106 detects such operations by the user (touch gestures), and determines the position and movement thereof to allow the control section 101 to perform corresponding processes.

Typical examples of the image display apparatus 100 as illustrated in FIG. 3 include smartphones and tablets as described in Patent Document 1. However, the present invention is not limited thereto, and the image display apparatus may be other information terminals such as touch screen PCs and digital cameras.

(Operation Processing of First Embodiment)

Hereinafter, the operation processing in the image display apparatus according to the present invention will be described. Upon browsing an image, operations by the user to zoom-in/out, parallelly shift or rotate the image for improving the viewability are the same as those illustrated in FIGS. 1 and 2.

The embodiment is the same as prior art apparatuses in which the parameters of zooming in/out, parallel shifting and rotation are changeable by two-finger pinch gestures upon browsing an image on the display section 104. However, the first embodiment is configured so that releasing two fingers from the touch screen causes the rotation angle with respect to the image before the pinch gesture to be converged to any of a plurality of predetermined fixed values. In the first embodiment, the fixed angle values are multiples of 90° (clockwise rotations of 0°, 90°, 180° and 270°). When the contact with the input section 106 is lost while browsing an image, the display process causes the rotation angle to be gradually changed toward the closest value of the four fixed values so that it is eventually converged to the closest value out of the four fixed values. If the rotation angle with respect to the original image before the pinch gesture is in the range of from 0° to 45°, it is converged to the fixed value of 0°. Similarly, the rotation angle in the range of more than 45° to 135° is converged to the fixed value of 90°, the rotation angle in the range of more than 135° to 225° is converged to the fixed value of 180°, the rotation angle in the range of more than 225° to 315° is converged to the fixed value of 270°, and the rotation angle of more than 315° is converged to the fixed value of 0°.

FIG. 4 is an explanatory view for describing rotation angle control of the first embodiment. In the illustrated example, when a user finishes a browsing operation and releases his/her two fingers from the touch screen, if the rotation angle is in the range of more than 0° to 45°, the rotation angle is converged (corrected) to 0°, the closest fixed value. Similarly, if the rotation angle is in the range of more than 45° to 135°, the rotation angle is converged (corrected) to 90°, the closest fixed value. In this way, by roughly setting a browsing angle by means of a pinch gesture, after the two fingers are released from the touch screen, the rotation angle is converged to one of the fixed values, which are set at 90° increments. That is, in the first embodiment, user operations are assisted so that an image is displayed at an appropriate display angle after a pinch gesture is released. This is also advantageous in that a user can view the overall image at a desired display angle without any obstacles (i.e. his/her two fingers in a pinch gesture) after the two fingers are released from the touch screen.

The theory of using a two-finger pinch gesture to zoom-in/out, parallelly shift and rotate control a display image is described with reference to FIGS. 5*a* to 5*c*. Given the conversion (zooming-in/out, parallel shifting, rotation) by a 3×3 matrix M, it satisfies the relational expression of FIG. 5*a* based on the homogeneous coordinate system. In FIG. 5*a*, "M" is conversion (zooming-in/out, parallel shifting, rotation) by a 3×3 matrix; "p" is coordinate of an arbitrary point before conversion; and "q" is coordinate of the arbitrary point after conversion. If the coordinates of two points designated by a pinch gesture are moved, as illustrated in FIG. 5*b*, before and after the conversion, matrix M can be obtained from the expressions of FIG. 5*c*. In FIG. 5*b*, $p_1$ and $p_2$ are two point designated by a pinch gesture before conversion, and $q_1$ and $q_2$ are two point designated by a pinch gesture after conversion. The expressions of FIG. 5*c* are thus obtained, on which basis the zoom-in/out, parallelly shift or rotate control is performed on the original display image.

Figure 6:
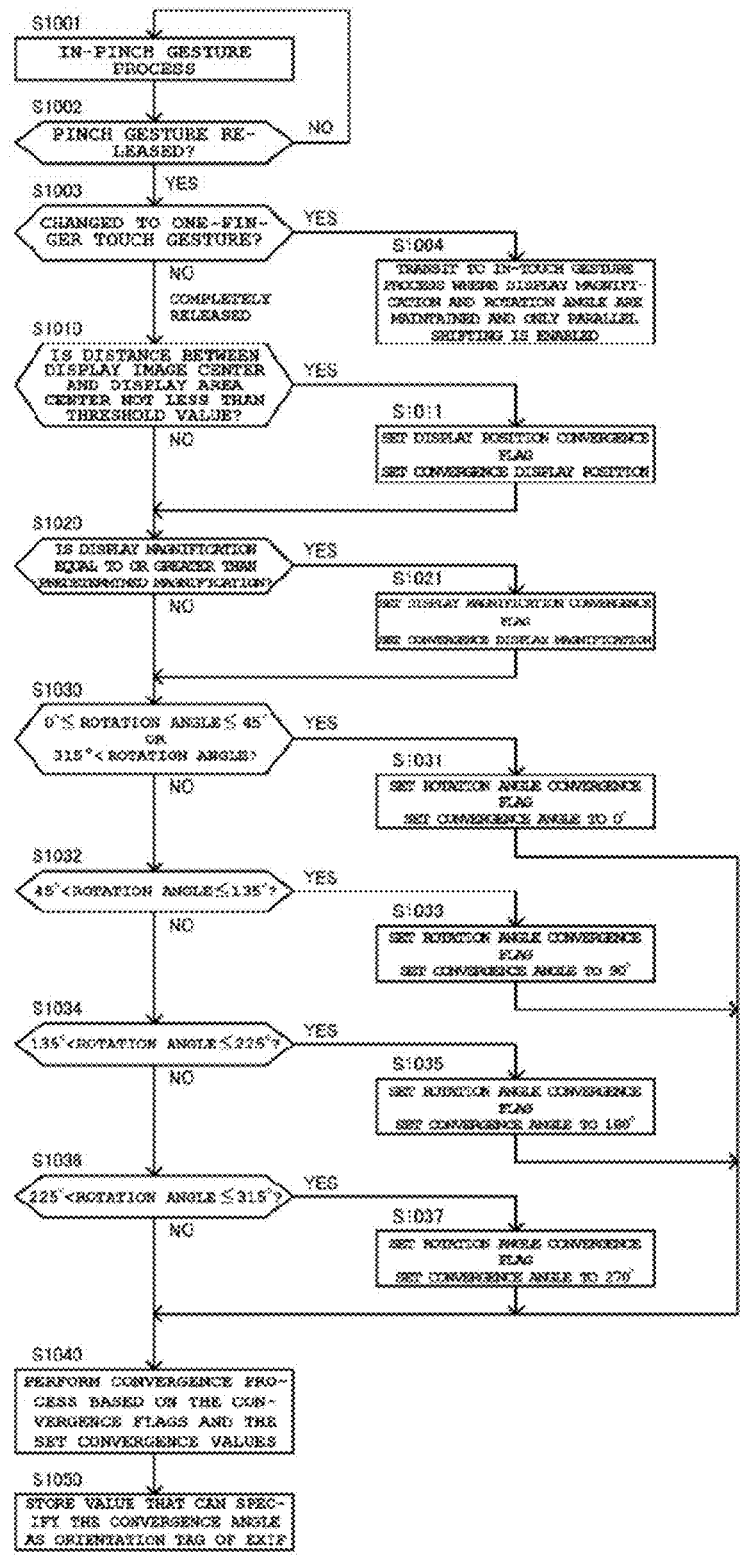
FIG. 6 is a flowchart of a program implemented in the image display apparatus according to the first embodiment.

FIG. 6 is a flowchart illustrating a process according to the embodiment, which is a part of processes of the programs executed by the control section 101. The process illustrated in this flowchart is an interrupt process that is performed during, for example, an in-pinch gesture process (a process to rotate, parallelly shift or zoom-in/out a display image according to a pinch gesture). While the in-pinch gesture process is running (S1001), a determination is made as to whether the pinch gesture is released as an interruption (S1002). If it is not released (S1002, No), the in-pinch gesture process continues. If it is released (S1002, Yes), a determination is made as to whether only a single point is being designated on the input section 106, i.e. whether the gesture on the touch screen is changed to a one-finger touch gesture (S1003). If the gesture is changed to a touch gesture (S1003, Yes), the rotation angle and display magnification of the display image are maintained at the values at the time the pinch gesture is released, and the process proceeds to an in-touch gesture process (S1004) where only parallel shifting of the display image according to a touch gesture (a one-finger drag gesture on the touch screen) is enabled.

As a result, the user can watch the displayed image at a fixed rotation angle and a display magnification. This is advantageous in that the user can set an optimum rotation angle and an optimum display magnification by means of a two-finger pinch gesture, and then simply release one finger (while leaving only one finger on the touch screen) to change the gesture to a touch gesture so that he/she can watch the image with fewer obstacles (one finger) at the rotation angle and display magnification at the time the pinch gesture is released. Furthermore, the user can parallelly shift the display image while retaining the rotation angle and the display magnification by using the one finger placed on the touch screen so as to display the image at a desired position.

During the in-touch gesture process, a determination is made in an interrupt process as to whether the gesture has been changed to a pinch gesture, and whether the gesture on the touch screen has been completely released (where the input section 106 detects no input). If it is determined that the gesture has been changed to a pinch gesture in the interrupt process, the process returns to the in-pinch gesture process again, where rotation, parallel shifting or zooming in/out of the display image are re-enabled. Therefore, even if the rotation angle or the display magnification setting is found to be undesirable after the gesture has been changed to a touch gesture, it is possible to switch the gesture to a pinch gesture again in order to adjust the rotation angle and the display magnification. If it is determined that the gesture on the touch screen has been completely released in the interrupt process (where the input section 106 detects no input), the process proceeds to step S1010 (described below).

In step S1003, if it is determined that the gesture has not been changed to a touch gesture but has been completely released (where the input section 106 detects no input) (S1003, No), a determination is made as to whether the distance from the center of the display image to the center of the display area of the touch screen (i.e. the screen center) is equal to or above a threshold (S1010). If the distance is equal to or above the threshold (S1010, Yes), the process sets a display position convergence flag, and also sets a display position (e.g. a coordinate of the center of the display image on the display area of the touch screen) so that the distance from the center of the display image to the center of the display area of the touch screen (i.e. the screen center) becomes less than a threshold (S1011).

If the step S1011 has been performed, display processing is performed in step S1040 based on the display position convergence flag so that the display image is gradually moved toward the set display position, and is eventually converged at the set display position. As a result, while a pinch gesture or a touch gesture is performed, if the display position of the image is located too close to the edges or if the image is partly cut off from the display area, the image is moved to a position where the overall image is viewable. A user may sometimes move the display image too far due to the difficulty in sensing the relationship between gesture distance and moving distance. In such cases, since the display image returns to an appropriate position once the gesture is completely released, a user can move the display image again from the returned position by a pinch or touch gesture. That is, the complicated operation to return the image to an appropriate position is no longer necessary.

Instead of using, as an indicator, the distance from the center of the display image to the center of the display area of the touch screen (i.e. screen center) to converge the display position so that the distance becomes less than the threshold, the distance from an edge of the display image to the boundary of the display area of the touch screen (i.e. the screen edge) may be used as an indicator and the display position is converged so that the distance becomes less than a threshold.

Next, a determination is made as to whether the magnification of the display image is equal to or above a predetermined value (e.g. not less than 400%) with respect to the original image before the pinch gesture (S1020). If the magnification is equal to or above the predetermined value (S1020, Yes), the process sets a display magnification convergence flag, and also sets a convergence display magnification (e.g. 200%) (S1021).

If step S1021 has been performed, display processing is performed in step S1040 based on the display magnification convergence flag so that the display image is gradually zoomed-out to the set display magnification, and is eventually converged at the set display magnification. As a result, when a pinch gesture is performed, even if the display magnification of the image is overly increased, the display magnification is reduced to a value at which the overall image is viewable. A user may sometimes overly zoom-in the display image due to the difficulty in sensing the relationship between gesture distance and moving distance. In such cases, since the magnification returns to an appropriate value once the gesture is completely released, a user can zoom-in/out the display image again from the returned magnification by a pinch gesture. That is, the complicated operation for changing the magnification of the image back to an appropriate value is no longer required. In step S1021, it is preferable that the converged display magnification is set to a maximum value at which the overall image can be displayed on the display area. With this configuration, the image is displayed at a maximum size at which the overall image can be displayed, and a user can readily grasp the whole figure of the display image.

The display magnification may be converged based on whether the display magnification is not more than a predetermined value rather than converging the display magnification based on whether the display magnification is equal to or above a predetermined value. In this case, even if the display magnification of the image is overly zoomed-out by a pinch gesture, the magnification is increased to a value at which the overall image is viewable. A user may sometimes overly zoom-out the display image due to the difficulty in sensing the relationship between gesture distance and moving distance. In such cases, since the magnification returns to an appropriate value once the gesture is completely released, a user can zoom-in/out the display image again from the returned magnification by a pinch gesture. That is, the complicated operation for changing the magnification of the image back to an appropriate value is no longer required.

Next, a determination is made as to whether the rotation angle is in the range of 0°≤rotation angle≤45° or 315°<rotation angle with respect to the original image before the pinch gesture (S1030). If the rotation angle is 0°≤rotation angle≤45° or 315°<rotation angle (S1030, Yes), the process sets a rotation angle convergence flag, and also sets a convergence angle to 0° (S1031).

Next, a determination is made as to whether the rotation angle is in the range of 45°<rotation angle≤135° with respect to the original image before the pinch gesture (S1032). If the rotation angle is 45°<rotation angle≤135° (S1032, Yes), the process sets the rotation angle convergence flag, and also sets the convergence angle to 90° (S1033).

Next, a determination is made as to whether the rotation angle is in the range of 135°<rotation angles 225° with respect to the original image before the pinch gesture (S1034). If the rotation angle is 135°<rotation angle≤225° (S1034, Yes), the process sets the rotation angle convergence flag, and also sets the convergence angle to 180° (S1035).

Next, a determination is made as to whether the rotation angle is in the range of 225°<rotation angles 315° with respect to the original image before the pinch gesture (S1036). If the rotation angle is 225°<rotation angle≤315° (S1036, Yes), the process sets the rotation angle convergence flag, and also sets the convergence angle to 270° (S1037).

If any of the above steps S1031, S1033, S1035 and S1037 has been performed, display processing is performed in step S1040 based on the rotation angle convergence flag such that the display image is gradually rotated toward the set rotation angle, and is eventually converged at the set rotation angle. Since users usually view an image based on the longitudinal or width direction of the display area of the touch screen, they are likely to set the rotation angle of the display image to any one of 0°, 90°, 180° (upside down) and 270° in most cases. Therefore, by setting the rotation angle to any one of these angles, users can view the image at an appropriate orientation. In contrast, in prior art apparatuses, it is difficult to rotate the display image so as to set the rotation angle to such desired angles using only a pinch gesture. Furthermore, in prior art apparatuses, the problem with setting a desired display angle using a pinch gesture is that the two fingers of the pinch gesture interrupt the view, which makes it difficult to view the overall display image. In this regard, in the embodiment, it is determined which of the above-described rotation angles is the closest to the rotation angle of the image at the time the pinch gesture is released, and the rotation angle is converged to the determined angle. As a result, users are not required to perform a difficult operation in order to precisely adjust the rotation angle. Rather, the apparatus can be operated by the user so as to display an image at a desired angle by roughly setting the rotation angle. Furthermore, a user can view the overall display image without interruption from the fingers of the gesture.

After step S1040 has been performed, a value corresponding to the determined convergence angle (a value corresponding to 0°, 90°, 180° or 270°) is stored as meta-data of the display image. For example, if the display image is an EXIF (exchangeable image file format) file, it is stored as an orientation tag (S1050).

This allows for readily storing the rotation angle (convergence angle) of the display image in the image data. Furthermore, when viewing the same image again, it is displayed in an appropriate orientation by referring to the stored rotation angle. As a result, the operation to rotate the image to the desired angle when viewing the same image again can be omitted. Also, a storage area reserved in advance for an image format can be utilized for the purpose of retaining the rotation angle. Generating and storing extra information other than the image data, such as pixel values, is not required.

In step S1040, the convergences of the display position, display magnification and rotation angle are performed respectively based on the display position convergence flag, display magnification convergence flag and rotation angle convergence flag, and they may be performed in any sequence. Further, the settings of the convergence display position, convergence display magnification and convergence angle may be performed in any sequence. It is preferable that the convergence of the rotation angle is firstly performed, and then the convergence of the display magnification is performed based on the converged rotation angle so as to set the display magnification to the maximum value at which the overall display image can be displayed on the display area. (After the convergence of the rotation angle is complete, the display magnification is set to the maximum value that allows the overall display image to be displayed on the display area, and the image is converged at the set display magnification.) Lastly, the convergence of the display position is performed to conform the center of the display image to the center of the display area. (After the convergence of the display magnification is complete, the display position is set to the center coordinate of the display area, and the display image is moved so that the center thereof is positioned at the set coordinate.) This is because the maximum display magnification at which the overall image can be displayed on the display area varies depending on whether the rotation angle is converged to 0° and 180°, or to 90° and 270°, assuming the length of the display section differs from the width of the display section. That is, the convergence display magnification is dependent on the convergence rotation angle, and the convergence distance of parallel shifting is dependent on both the convergence rotation angle and the convergence display magnification. This procedure allows the overall image to be displayed at a desired angle and at a size as large as possible.

The foregoing touch screen operations according to the first embodiment are summarized as follows.

The following four operational states are assumed for describing the operation.

(1) A state where no finger is in contact with the touch screen, and the display image remains still.

(2) A state where a one-finger touch gesture is being performed, and only parallel shifting of the display image is enabled.

(3) A state where a two-finger pinch gesture is being performed, and zooming-in/out, parallel shifting and rotation of the display image are all enabled.

(4) A state where no finger is in contact with the touch screen, and an animation is being displayed in which the display image gradually moves toward the set magnification, position and angle.

Transition from (1) to (2) occurs in response to a one-finger touch gesture, and transition from (1) to (3) occurs in response to a two-finger pinch gesture. Transition from (2) to (3) occurs when a one-finger touch gesture is switched to a two-finger pinch gesture, and transition from (2) to (4) occurs when the one finger of a touch gesture is released from the touch screen. The transition from (3) to (2) occurs when one of the two fingers of a pinch gesture remains on the touch screen while the other finger is released from the touch screen so as to switch the pinch gesture to a touch gesture, and transition from (3) to (4) occurs when both of the two fingers of a pinch gesture are released from the touch screen. Transition from (4) to (1) occurs upon completion of the animation of the display image as it gradually moves toward the set magnification, position and angle so that the display image is converged at the set magnification, position and angle. Transition from (4) to (2) occurs in response to a one-finger touch gesture. Transition from (4) to (3) occurs in response to a two-finger pinch gesture.

(Second Comparative Example)

Figure 7:
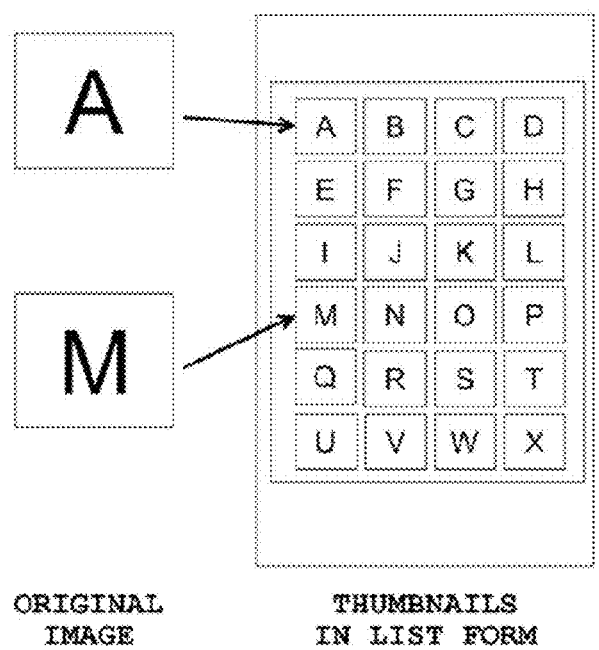
FIG. 7 is a view for describing a conventional operation embodiment of an image display apparatus.

Next, a conventionally-used operation manner known in the art will be described as a second comparative example. As illustrated in FIG. 7, image display apparatuses such as smartphones and tablets can display stored images (original images) in the form of a thumbnail list. While a thumbnail list is displayed, if a user wants to collectively apply specific processes (e.g. deletion or attachment to an e-mail) to a plurality of thumbnails (i.e. a plurality of original images corresponding to the plurality of thumbnails) among the displayed thumbnails, he/she normally repeats a tap gesture (a quick single touch on a touch screen) on the target thumbnails one by one in order to select the plurality of target thumbnails. The thumbnails thus selected are displayed in a selected style, and a selection flag is set to the images of the selected thumbnails so that they are included as targets for batch processing according to the subsequent operation (e.g. deletion or attachment operation).

If a device such as keyboard and mouse is used as an input device, as in PCs and the like, a user firstly puts a cursor on the screen to the outer side of a group of thumbnails to be selected as targets, and then performs a dragging operation, as illustrated in FIG. 8a. By doing so, the thumbnails included in a rectangle whose diagonal connects the start and end points of the dragging operation are displayed in a selected style (in this example, in a bold frame), and the selection flag is set to the images corresponding to the thumbnails. Meanwhile, in order to change the thumbnails from the selected style to an unselected style (in order to cancel the selection flag that has been set to the corresponding images), the user uses a mouse in conjunction with the control key or the like of a keyboard as illustrated in FIG. 8b to perform an operation. For example, the user firstly puts a cursor at the outer side of a group of thumbnails to be changed from the selected style to the unselected style, and then drags it while holding down the control key. As a result, the thumbnails included in a rectangle whose diagonal connects the start and end points of the dragging operation are changed from the selected style (in this example, in a bold frame) to the unselected style (in this example, in a narrow frame), and the selection flag is cancelled in the images corresponding to the thumbnails that have changed to the unselected style.

In contrast, image display apparatuses such as smartphones and tablets typically do not have a key that corresponds to the control key of PCs. Therefore, to change certain thumbnails from the selected style to the unselected style, a control key or the like needs to be displayed on the touch screen in order to enable user operations, or else a user has to tap the thumbnails one by one. Further, it has not been possible to perform an inversion operation on a plurality of thumbnails all at once. An inversion operation refers to an operation to change the display style of thumbnails from the selected style to the unselected style, or from the unselected style to the selected style. Therefore, a user is required to tap the thumbnails to be inverted one by one. As summarized in FIG. 9, selection, un-selection and inversion operations can all be performed on individual thumbnails in conventional touch screen operation methods. However, an operation to collectively change a plurality of thumbnails to the selected style and an operation to collectively change a plurality of thumbnails from the selected style to the unselected style cannot be performed. In addition, an operation to collectively invert the style of a plurality of thumbnails cannot be performed. These problems are solved by the following image display apparatus and program according to a second embodiment.

(Operation Processing of Second Embodiment)

The hardware configuration of the image display apparatus according to the second embodiment is the same as that of the image display apparatus 100 of the first embodiment, and the description thereof is omitted. Hereinafter, operation processing in the image display apparatus 100 according to the second embodiment will be described. The following operation processing is performed for selecting a target of specific processing (e.g. deletion or attachment to an e-mail) from a thumbnail list.

While the image display apparatus 100 is in the state where thumbnails are displayed thereon as illustrated in FIG. 7, such as a non-selection mode where thumbnails can be zoomed-in or zoomed-out by a pinch-out or pinch-in gesture as described in the following third embodiment, a user performs a mode transition operation to change the mode to a selection mode for selecting target thumbnails of specific processing. An example transition operation involves a long tap on an arbitrary part of a touch screen for a predetermined time (e.g. 0.6 second) or more. The mode transits back to the non-selection mode if an operation to cancel the selection mode is performed, or if the conditions for cancelling the selection mode are satisfied.

Figure 10:
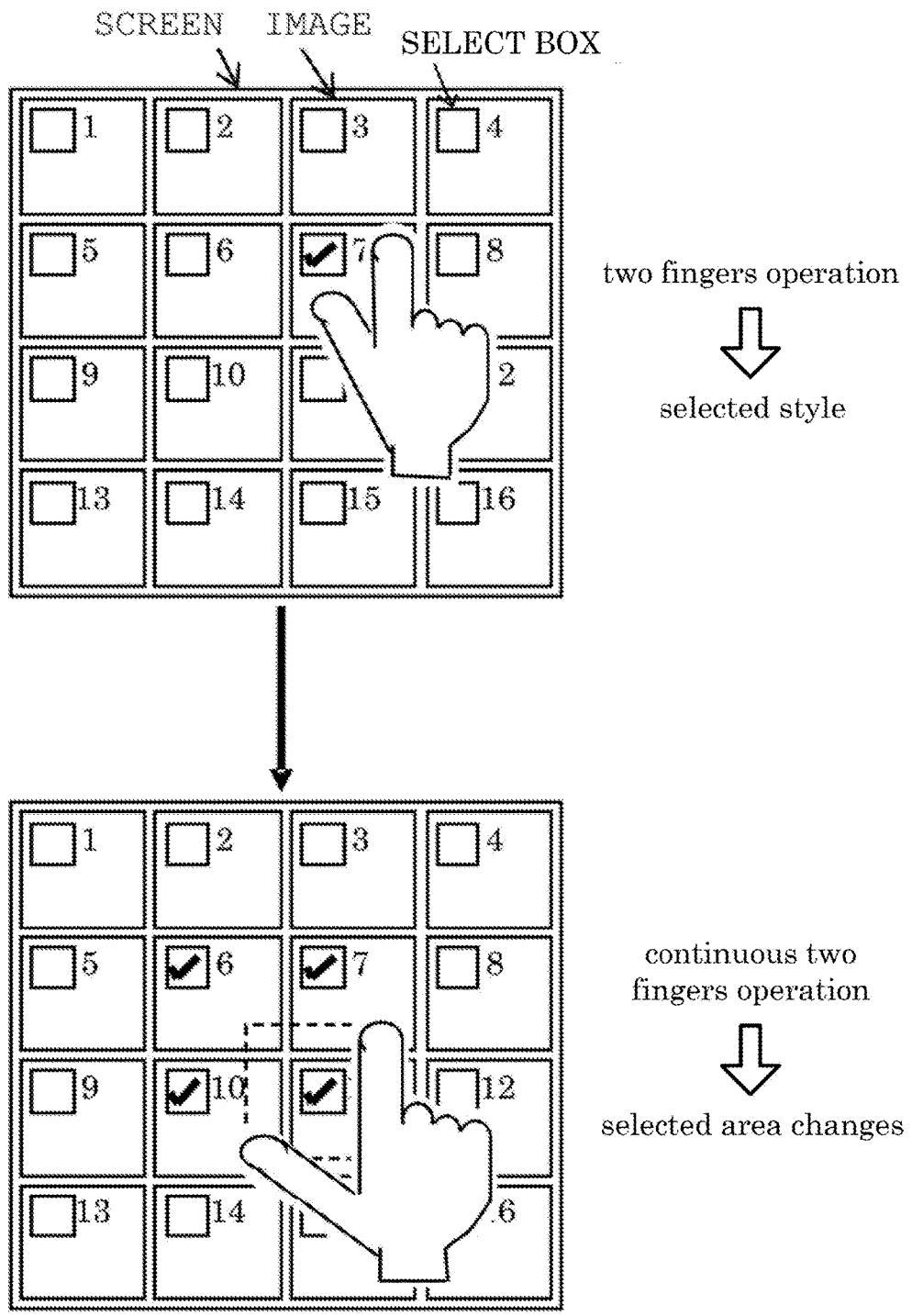
FIG. 10 is a view for describing an operation of selecting thumbnails according to the second embodiment.

If the mode transits to the selection mode, check boxes are displayed on the upper-left corners of the thumbnails, as illustrated in FIG. 10. The display style in the selection mode is not limited thereto. For example, check boxes may be displayed on the lower-right corners, or outer frames may be displayed around the thumbnails. In the embodiment, a thumbnail being displayed in the selected style means that the check box of the thumbnail is checked. Similarly, a thumbnail being displayed in the unselected style means that the check box of the thumbnail is not checked. At the time the user performs the above-described transition operation to selection mode, i.e. a one-finger long tap, if the coordinate of the touch point is included in the display area of any thumbnail, it is preferred that the thumbnail including this coordinate is displayed in the selected style in the selection mode. Therefore, an operation to select the target thumbnail again after the mode has transited to the selection mode can be omitted.

In the embodiment, when a user starts to perform a pinch gesture under the selection mode (when a user touches the touch screen with two fingers so as to start a multi-touch gesture), a selection or non-selection displaying process is performed on target thumbnails that are included in a rectangle whose diagonal connects the two designated coordinates. Specifically, if it is not true that "all of the target thumbnails are displayed in the selected style" before starting the pinch gesture, the selection displaying process is performed so that all of the target thumbnails are displayed in the selected style. If it is true that "all of the target thumbnails are displayed in the selected style" before starting the pinch gesture, the non-selection displaying process is performed so that all of the target thumbnails are displayed in the unselected style.

The above-described transition operation to the selection mode is not limited to a one-finger long tap, and may be a two-finger (pinch gesture) long tap instead. For example, the mode may transit to the selection mode when a two-point multi-touch gesture continues for a predetermined period of time (e.g. 0.6 second) or more. In this case, it is preferred that all thumbnails contained within a rectangle whose diagonal connects the two coordinates designated by the pinch gesture of the transition operation are displayed in the selected style after the mode transits to selection mode. Therefore, an operation to select target thumbnails again after the mode transits to selection mode can be omitted.

If the two fingers that have performed the pinch gesture are not released from the touch screen so as to keep the multi-touch gesture, and if the two fingers then successively perform a pinch-in gesture or pinch-out gesture, the display style of the thumbnails included in the area designated by the multi-touch gesture before the pinch-in or pinch-out gesture is reflected in the display style of the thumbnails included in the area that is newly designated by the multi-touch gesture after the pinch-in or pinch-out gesture. The foregoing applies in the state after the mode has transited to selection mode and then the user has started performing a pinch gesture so that the selection displaying process or non-selection displaying process has been performed, or, in the case where the selection mode transition operation is the above-described pinch gesture, the state after the user has performed the pinch gesture so that the mode has transited to selection mode and all thumbnails included in the area designated by the pinch gesture are displayed in the selected style. That is, if the thumbnails included in the rectangle whose diagonal connects the two coordinates designated by the multi-touch gesture before the pinch-in or pinch-out gesture were displayed in the selected style, the thumbnails included in the rectangle whose diagonal connects the two coordinates designated by the multi-touch gesture after the pinch-in or pinch-out gesture are displayed in the selected style. If the thumbnails included in the rectangle whose diagonal connects the two coordinates designated by the multi-touch gesture before the pinch-in or pinch-out gesture were displayed in the unselected style, the thumbnails included in the rectangle whose diagonal connects the two coordinates designated by the multi-touch gesture after the pinch-in or pinch-out gesture are displayed in the unselected style.

Figure 11:
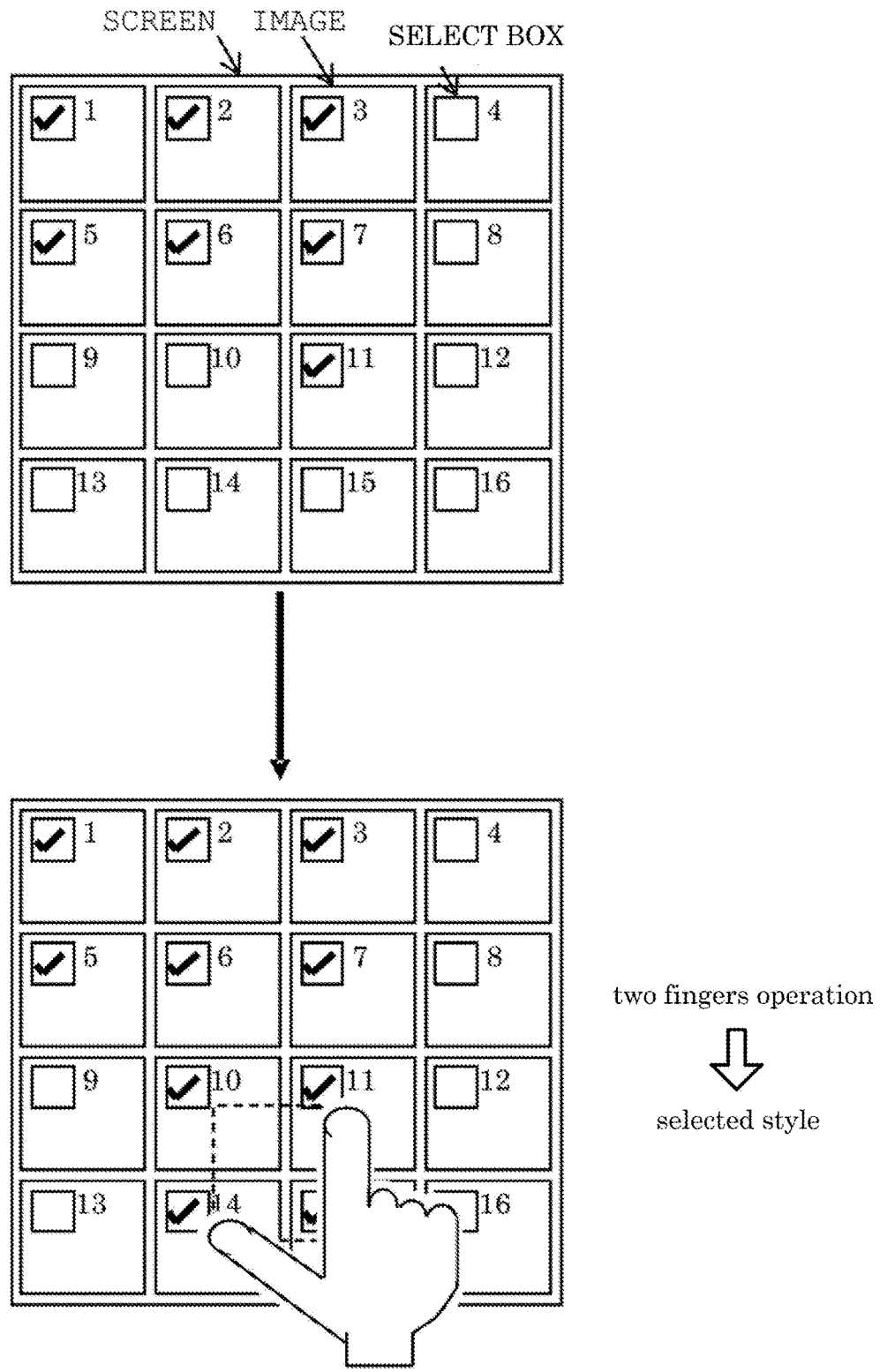
FIG. 11 is a view for describing an operation of selecting thumbnails according to the second embodiment

In the example illustrated in FIG. 10, thumbnail 7 is included in a designated area at the time a user starts a pinch gesture (when a multi-touch gesture is detected). Then, since thumbnail 7 was displayed in the unselected style before the detection of the multi-touch gesture, thumbnail 7 is changed to be displayed in the selected style. Following this, when the user performs a pinch-out gesture to newly designate an area that includes thumbnails 6, 10 and 11, these thumbnails are all changed to the selected style because thumbnail 7, which was included in the designated area before the pinch-out gesture, was displayed in the selected style. In the example illustrated in FIG. 11, thumbnails 10, 11, 14 and 15 are included in a designated area at the time a user starts a pinch gesture (when a multi-touch gesture is detected). Before the user starts the pinch gesture (before the multi-touch gesture is detected), only thumbnail 11 was displayed in the selected style, and thumbnails 10, 14 and 15 were displayed in the unselected style. Therefore, thumbnails 10, 14 and 15 are all changed to be displayed in the selected style. In the embodiment, thumbnails that are not included in the area designated by a pinch gesture are displayed in the same display style as they were before the pinch gesture is detected (the multi-touch gesture is detected). Accordingly, if a thumbnail is excluded from the designated area by a pinch-in gesture, and if it was displayed in the selected style before the multi-touch gesture of the pinch gesture is detected, it remains displayed in the selected style. If it was displayed in the unselected style, it remains displayed in the unselected style.

Figure 12:
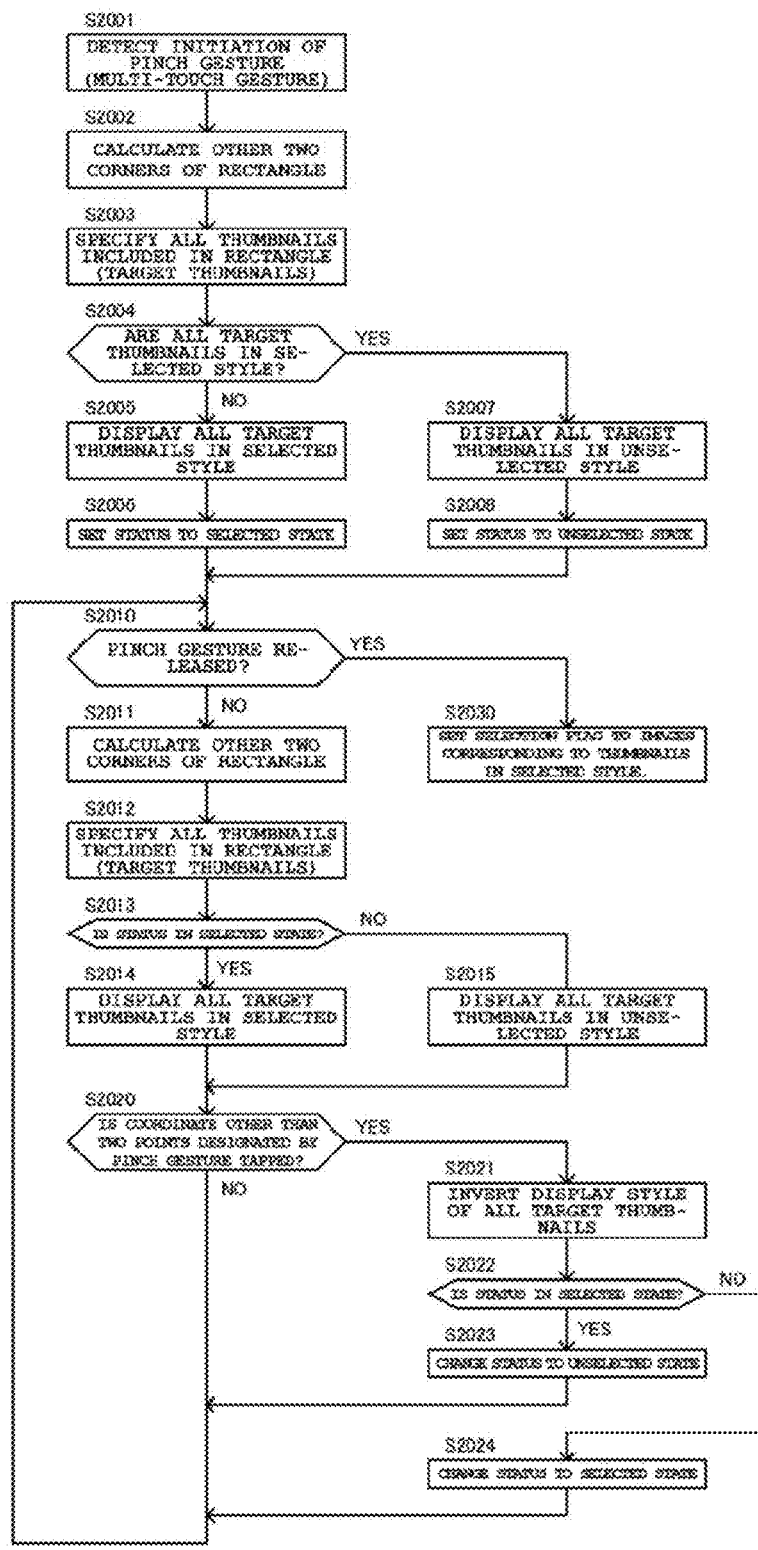
FIG. 12 is a flowchart of a program implemented by the image display apparatus according to the second embodiment.

FIG. 12 is a flow chart illustrating a process according to the embodiment, which is a part of processes of the programs executed by the control section 101. After the mode has transited to the selection mode, a user needing to select target thumbnails performs a multi-touch gesture by touching the input section 106 (display section 104) with two fingers, which causes the initiation of a pinch gesture (multi-touch gesture) to be detected (S2001). Further, a rectangle whose diagonal connects the coordinates of the two fingers on the touch screen, i.e. two coordinates designated by the pinch gesture, is defined, and the coordinates of the other two corners of the rectangle are calculated (S2002). Then, the thumbnails included in the rectangle whose corners are defined by the four coordinates, i.e. those included in a designated area, (hereinafter, also referred to as target thumbnails) are specified (S2003) from among the thumbnails.

As used herein, a thumbnail included in a designated area is defined as a thumbnail that is at least partly included in the rectangular area. However, a thumbnail included in a designated area may also be defined as a thumbnail that includes a predetermined number of coordinates within the designated area, or a thumbnail that is entirely included in the designated area, or a thumbnail whose center is included in the designated area. Further, the designated area is not limited to a rectangle defined by the coordinates of two contact fingers, and may have any two-dimensional shape specified by a predetermined operation, such as circle and oval.

Next, a determination is made as to whether it is true that "the thumbnails included in the designated area are all displayed in the selected style" (S2004). If it is not true that "the thumbnails included in the designated area are all displayed in the selected style" (S2004, No), the thumbnails included in the designated area turn to be all displayed in the selected style (S2005), and the status of the pinch gesture is set to selected state (S2006). If it is true that "the thumbnails included in the designated area are all displayed in the selected style" (S2004, Yes), the thumbnails included in the designated area turn to be all displayed in the unselected style (S2007), and the pinch gesture status is set to unselected state (S2008).

Thereafter, if release of the pinch gesture is detected (no multi-touch gesture is detected) (S2010, Yes), a selection flag is updated with regard to the thumbnails included in the designated area. Specifically, if the thumbnails included in the designated area are displayed in the selected style, the selection flags are set on the images corresponding to these thumbnails. If they are displayed in the unselected style, the selection flags on the corresponding images are canceled (S2030). That is, the display style of the thumbnails is reflected in the actual stored image data. After this step, the stored images with selection flags are recognized as targets for processing as requested by a user, such as deletion and attachment.

By way of contrast, if release of the pinch gesture is not detected (S2010, No), i.e. if the user continues the multi-touch gesture and further performs a pinch-out gesture or a pinch-in gesture, the selection flag is not updated. Instead, a rectangle whose diagonal connects the coordinates of the two points designated by the pinch gesture is defined, and the coordinates of the other two corners of the rectangle are calculated (S2011). Then, the thumbnails included in the rectangle whose corners are located at the four coordinates, i.e. those included in the designated area (target thumbnails), are all specified (S2012) from among the thumbnails.

Next, a determination is made as to whether the pinch gesture status is selected state or unselected state (S2013). If the status is selected state (S2013, Yes), the target thumbnails are all displayed in the selected style (S2014). If the status is unselected state (S2013, No), the target thumbnails are all displayed in the unselected style (S2015). By performing this display control process, the display style of the target thumbnails before expanding the designated area is reflected in the thumbnails that are newly included in the expanded designated area as a result of the pinch-out gesture. Further, the display style of the target thumbnails before reducing the designated area is reflected in the thumbnails that are included in the reduced designated area as a result of the pinch-in gesture. Thumbnails that are not included in the area designated by a pinch gesture remain displayed in the same display style as they were before the pinch gesture is detected (the multi-touch gesture is detected). In this way, a selected area (an area where thumbnails are displayed in the selected style) or an unselected area (an area where thumbnails are displayed in the unselected style) can be expanded by a pinch-out gesture, or the selected area or unselected area can be reduced by a pinch-in gesture. That is, target images can be readily marked as selected or unselected all at once by a pinch gesture. Furthermore, the selected area is dynamically changeable.

In the embodiment, when the designated area is expanded or reduced by a pinch-out or pinch-in gesture, the display style before the expansion or reduction is reflected in the above-described manner. However, it is not limited to the above-described manner, and may be performed as follows. If it is not true that "the target thumbnails are all displayed in the selected style" when another multi-touch gesture is newly detected, i.e. at the time the user starts another pinch gesture, the target thumbnails included in the expanded/reduced designated area are all displayed in the selected style. If it is true that "the target thumbnails are all displayed in the selected style", when another multi-touch gesture is newly detected, the target thumbnails included in the expanded/reduced designated area are all displayed in the unselected style. Following this, in response to further expansion or reduction of the designated area according to the pinch-out or pinch-in gesture without the multi-touch gesture being released, if the target thumbnails included in the designated area before the expansion/reduction are displayed in the selected style, the target thumbnails included in the expanded/reduced designated area are all displayed in the selected style (expansion/reduction of the designated area is performed). If no target thumbnail included in the designated area before the expansion/reduction is displayed in the selected style, the target thumbnails included in the expanded/reduced designated area are all displayed in the unselected style (expansion/reduction of the undesignated area is performed). The thumbnails that are not included in the area designated by the pinch gesture are displayed in the same style as that before the pinch gesture. That is, change of the target thumbnails included in the expanded-reduced designated area by the pinch gesture are monitored, and display styles of the target thumbnails are dynamically and correspondingly changed based on the change of designated target thumbnails (in this case, the pinch gesture status is not used). Further, if a thumbnail once included in the designated area is excluded from the designated area by a following pinch-in gesture, this thumbnail may retain the same display style as when it was included in the designated area.

Further, if another tap is further detected at a coordinate (the third coordinate) other than the two points designated by the pinch gesture (S2020, Yes), an inversion display process is performed on the thumbnails included in the selected area designated by the pinch gesture, i.e. in the rectangle whose diagonal connects the two points touched by the fingers. More specifically, if these thumbnails are displayed in the selected style, they are changed into the unselected style. If these thumbnails are displayed in the unselected style, they are changed to the selected style (S2021). Then, a determination is made as to whether the pinch gesture status is selected state or unselected state (S2022). If it is selected state (S2022, Yes), the status is changed to unselected state. If it is unselected state (S2022, No), the status is changed to selected state (S2024). In this way, the thumbnails in the selected area can be readily switched between the selected style and the unselected style all at once. If no inversion operation is detected, (S2020, No), or if the inversion display process is complete (S2021 to S2024), the process returns to step S2010, and a determination is made as to whether the pinch gesture is released. Inversion of the display style according to an inversion operation is not limited to the above-described example where all target thumbnails are changed from the selected style to the unselected style or from the unselected style to the selected style, and it may be performed in any manner as long as the display style of each thumbnail is inverted as a result of the inversion operation.

After the display style of the thumbnails is reflected in the selection flag of the stored images in step S2030, a user can allow the apparatus to perform desired processing on the images with the selection flags. Alternatively, in order to add the selected targets, the user can start another pinch gesture again so that the thumbnail selection process of step S2001 or later is repeated. By performing the selection process for plural times in this way, target thumbnails can be set in more detail. A batch process can then be performed on the images corresponding to the set target thumbnails when carrying out a predetermined processing.

After release of the pinch gesture is detected in step S2010, if a predetermined operation has been performed on the images to which the selection flag was set in S2030, or if no input to the input section 106 has been detected for a predetermined time, the selection mode is canceled. Alternatively, in the selection mode, if the user performs a one-finger long tap at an arbitrary position on the touch screen for a predetermined period of time or more, of if the user operates a "return" button, the selection mode is canceled. When the selection mode is canceled, the mode transits to a mode such as the non-selection mode where the thumbnails can be zoomed-in/out as described in the following third embodiment.

In the above-described embodiment, the selection flag is updated (set or canceled) upon release of the pinch gesture. However, the present invention is not limited thereto, and the selection flag may be updated concurrently with the display style of the thumbnails. That is, when the thumbnails are displayed in the selected style, the selection flag is set on the stored images corresponding to the thumbnails. When the thumbnails are displayed in the unselected style, the selection flag is not set on (removed from) the stored images corresponding to the thumbnails.

In the above-described embodiment, a determination is made as to whether it is true that "the thumbnails included in the designated area are all displayed in the selected style" (S2004). However, the present invention is not limited thereto, and a determination may be made as to whether it is true that "at least one of the thumbnails included in the designated area is displayed in the unselected style".

Further, the thumbnail selection display process of step S2004 to S2008 is not limited to the above-described manner. For example, the process may be performed as follows: if it is true that "at least one of the thumbnails included in the designated area is displayed in the selected style" at the time the user starts the pinch gesture, the thumbnails included in the designated area are all displayed in the unselected style. If it is true that "the thumbnails included in the designated area are all displayed in the unselected style" at the time the user starts the pinch gesture, the thumbnails included in the designated area are all displayed in the selected style. In addition, the selection process may also be performed such that: among the thumbnails included in the designated area at the time the user starts the pinch gesture, if the proportion of thumbnails displayed in the selected style is higher than a predetermined (proportion) value, such as 50%, these thumbnails are all displayed in the selected style. If the proportion of thumbnails displayed in the unselected style is higher than or equal to the predetermined (proportion) value, these thumbnails are all displayed in the unselected style. As described above, the thumbnail selection display process may be any process that changes all of the thumbnails included in the designated area into the selected style or the unselected style all at once.

In the above-described embodiment, a display processing is performed such that all target thumbnails are displayed in the selected or unselected style at the time the user starts the pinch gesture, and thereafter the inversion display process is performed at the time a tap gesture is detected. However, the present invention is not limited thereto. The display processing of displaying all target thumbnails in the selected or unselected style may be performed at the time the user performs a tap gesture rather than at the time the user starts the pinch gesture. In this operation embodiment, the display style of the target thumbnails does not change at the time the user starts the pinch gesture. Rather, later on, at the time a tap gesture (the first tap gesture) is detected, a display processing is performed such that all target thumbnails are displayed in the selected or unselected style. Furthermore, if another tap gesture (the second tap gesture) is detected while the pinch gesture is maintained, the inversion display process is preferably performed on all of the target thumbnails. In the embodiment, it is possible to switch the display style as to all of the target thumbnails between the selected style and the unselected style every time the user performs a tap gesture.

Moreover, if even another tap gesture (the third tap gesture) is detected while the pinch gesture is maintained, a flag inversion display process which reflects to a display style of each thumbnail, its inverted flag state (if the selection flag was set to the thumbnail, the thumbnail is displayed in the unselected style, or if the selection flag was not set to the thumbnail, the thumbnail is displayed in the selected style). In the embodiment, it is possible to switch the display style as to the target thumbnails among all in the selected style, all in the unselected style and each in a style inverted from the set flag, every time the user performs a tap gesture.

Here, in the embodiment, the display styles of the target thumbnails are all at once changed from the unselected style to the selected style (or from the unselected style to the selected style) by the second tap gesture, and the flag inversion display process is performed by the third tap gesture. But the present invention is not limited thereto. The order of the above-mentioned display processes may be optional. For example, the flag inversion process may be performed on the target thumbnails by the first tap, all the target thumbnails are displayed in the selected style or in the unselected style by the second tap, and the selected style and the unselected style may be switched as to all the target thumbnails by the third tap gesture.

Figure 25:
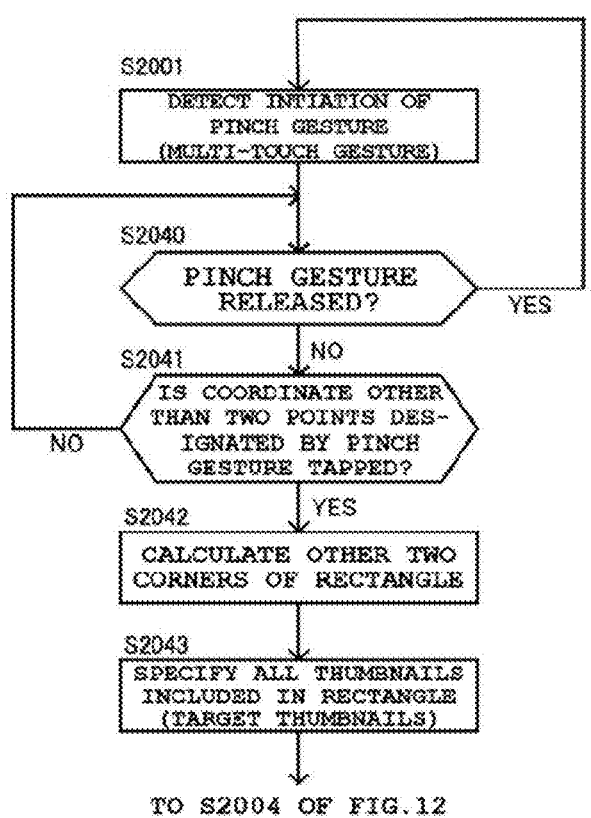
FIG. 25 is a flowchart of a program implemented by the image display apparatus according to a variation.

FIG. 25 is a flowchart illustrating an example of the process of this case that the control section 101 performs in place of the process of FIG. 12. Since the process of FIG. 25 is a partial modification of the process of FIG. 12, the same part as the process of FIG. 12 is only indicated by the number of the subsequent step, and the same steps are omitted in the figure.

In response to detecting the initiation of a pinch gesture in step S2001, the control section 101 determines as to whether the pinch gesture is released (S2040). If it is determined that the pinch gesture is released (S2040, Yes), the control section 101 returns the process to S2001. If it is determined that the pinch gesture is not released (S2040, No), the control section 101 determines as to whether another tap is performed at a coordinate other than the two points designated by the pinch gesture (S2041).

If it is determined that no tap is performed (S2041, No), the control section 101 returns the process back to S2040. If it is determined that another tap is performed (S2041, Yes), the control section 101 defines a rectangle whose diagonal connects the coordinates of the two points designated by the pinch gesture, and calculates the coordinates of the other two corners of the rectangle (S2042). Then, the control section 101 specifies all of the target thumbnails that are included in the rectangle whose corners are located at the determined four coordinates from among the thumbnails (S2043). Then, the control section 101 advances the process to step S2004 of FIG. 12. The rest of the process is the same as the process of FIG. 12.

In the above-described process, in the case where the pinch gesture is not released but maintained (S2040, No), if another tap is performed at a coordinate other than the two points designated by the pinch gesture (S2041, Yes), the target thumbnails are specified (S2042, S2043), and the selection/non-selection displaying process of the target thumbnails is performed (S2004 through S2008 of FIG. 12). That is, the display style of the target thumbnails is not changed at the time the initiation of the pinch gesture is detected. Thereafter, at the time a tap gesture (first tap) is detected, the target thumbnails turn to be all displayed in the selected style or the unselected style.

Further, in the process of FIG. 12, in the case where the pinch gesture is not released but maintained (S2010, No), if another tap is performed at a coordinate other than the two points designated by the pinch gesture (S2020, Yes), the inversion display process is performed to invert the display style of all target thumbnails (S2021). These steps S2010 through S2024 form a loop process, and are repeated. Therefore, while the pinch gesture is not released, the inversion display process of the target thumbnails is performed every time the user performs a tap gesture. That is, the display style of the target thumbnails switches between the selected style and the unselected style by each tap operation.

The same goes for the flag inversion display process, where the display style is switched between the selected style and the unselected style based on the selection flag set on the target thumbnails. That is, in the process of FIG. 25, every time a tap gesture is performed without releasing the pinch gesture, a decision is made as to whether the display style is switched to the selected style or the unselected style based on the selection flag (on/off) of the target thumbnails, and the inversion display process of the target thumbnails is performed accordingly.

In the above-described embodiment, the inversion display process and the flag inversion display process are performed according to a tap gesture. However, the present invention is not limited thereto, and it may be performed according to other operations such as shaking, for example.

Next, the operation manner according to the embodiment will be described with reference to FIGS. 13a to 13c, 14d to 14f and 15. As illustrated in FIG. 13a, after the mode has transited to the selection mode, thumbnails 1 to 25 in the list form are all displayed in the unselected style. In response to a pinch gesture (the first pinch gesture) by a user in this state, the apparatus displays thumbnails 7, 8 12 and 13 in the selected style, all of which are included in a rectangle whose diagonal connects the two points designated by the pinch gesture (points A and B in the example), as illustrated in FIG. 13b (since the determination in step S2004 is "No", the target thumbnails are all displayed in the selected style in step S2005, and the status is set to selected state in step S2006).

When the user further performs a pinch-out gesture without releasing the pinch gesture (the first pinch gesture), i.e. while continuing the multi-touch gesture (S2010, No), the apparatus displays thumbnails 1 to 4, 6 to 9, 11 to 14 and 16 to 19 in the selected style, all of which are included in a rectangle whose diagonal connects the two points after the pinch-out gesture (points A and B), as illustrated in FIG. 13*c* (since the target thumbnails after the pinch-out gesture are specified in steps S2011 and S2012, and since the determination in step S2013 is "Yes", the target thumbnails are all displayed in the selected style in step S2014). If the pinch gesture is released in this state (S2010, Yes), the selection flag is set to the images corresponding to thumbnails 1 to 4, 6 to 9, 11 to 14 and 16 to 19, all of which are displayed in the selected style (S2030).

When the user further performs another pinch gesture (the second pinch gesture) while the selection mode is maintained, the apparatus displays thumbnails 7 to 9, 12 to 14, 17 to 19 in the unselected style, all of which are included in a rectangle whose diagonal connects two points designated by the pinch gesture (points A and B in the example), as illustrated in FIG. 14*d* (since the determination in step S2004 is "Yes", the target thumbnails are all displayed in the unselected style in step S2007, and the status is set to unselected state in step S2008).

If the user further performs a pinch-in gesture without releasing the pinch gesture (second pinch gesture), i.e. while continuing the multi-touch gesture (S2010, No), the apparatus displays thumbnails 12, 13, 17 and 18 in the unselected style, all of which are included in a rectangle whose diagonal connects the two points after the pinch-in gesture (points A and B), as illustrated in FIG. 14*e* (since the target thumbnails after the pinch-out gesture are specified in steps S2011 and S2012, and since the determination in step S2013 is "No", the target thumbnails are all displayed in the unselected style in step S2015). In this step, since thumbnails 7 to 9, 14 and 19 were displayed in the selected style before the second pinch gesture is detected, they are displayed in the selected style after they are excluded from the target thumbnails by the pinch-in gesture.

The user further performs a tap gesture (a quick single-touch at point C) without releasing the pinch gesture (second pinch gesture), i.e. while continuing the multi-touch gesture, as illustrated in FIG. 14*f* (S2020, Yes). Then, since all target thumbnails are displayed in the unselected style, the inversion display process is performed (the inversion display process of step S2021 is performed, the determination in step S2022 is "No", and the status is changed to selected state in step S2024).

If the user further performs a pinch-out gesture without releasing the pinch gesture (second pinch gesture), i.e. while continuing the multi-touch gesture (S2010, No), the apparatus displays thumbnails 12, 13, 17, 18, 22 and 23 in the selected style, all of which are included in a rectangle whose diagonal connects the two points after the pinch-out gesture (points A and B), as illustrated in FIG. 15*g* (since the target thumbnails after the pinch-out gesture are specified in steps S2011 and S2012, and since the determination in step S2013 is "Yes", the target thumbnails are all displayed in the selected style in step S2014). In this way, the area where the inversion display process is performed can be expanded or reduced.

(Third Comparative Example)

Next, a conventionally-used operation manner known in the art will be described as a third comparative example. Image display apparatuses such as smartphones and tablets can display stored images (original images) in the form of a thumbnail list as illustrated in FIG. 7. There is a need for a function to zoom-in/out such thumbnails displayed in a list form. Methods of displaying such zoomed-in/out thumbnails include discretely displaying methods and continuously displaying methods in prior art. In the continuously displaying methods, a thumbnail list is processed as if it were a single image, and is zoomed-in/out according to a zoom-in/out operation. However, the problem is that, when the list is zoomed-in, thumbnails located near the edges of the display section may be partly missing, or some thumbnails may not be displayed at all if they are located outside the display area of the display section. As a result, another operation such as scrolling is required after the zooming-in/out process.

In the discretely displaying methods, thumbnails are suitably rearranged according to a zoom-in/out operation such as a two-finger pinch gesture, where the side length (upper and lower sides) of each thumbnail and the length of the upper and lower sides of the display section are taken into consideration so that no thumbnail is partly missing in the width direction. For example, zooming-in is performed according to a zoom-in gesture (pinch-out gesture), which is to expand the distance between two fingers of a pinch gesture, and zooming-out is performed according to a zoom-out gesture (pinch-in gesture), which is to narrow the distance between two fingers. By way of a specific example, the side length of each thumbnail is set to the value of the length of the upper or lower side of the display section divided by any natural number n, where the natural number n varies according to a zoom-in/out operation, and the thumbnails are rearranged every time the natural number n changes. In this case, of course, the natural number n varies in a discrete fashion. Therefore, during a zoom-in/out operation, there are some periods of time in which the natural number n does not change. As a result, the thumbnail list is also updated in a discrete fashion accordingly. The drawback to updating the thumbnail list in a discrete fashion in this way is that a smooth-feeling interface cannot be provided due to such poor engaging response (adherence) between the zoom-in/out operation and zooming-in/out of the display.

Furthermore, another problem with updating a thumbnail list in a discrete fashion as described above is that each thumbnail changes its position in the list before and after a zoom-in/out operation, and a user may lose sight of a desired thumbnail that was being viewed. By way of a specific example, four thumbnails are displayed (n=4) in the width direction before a zoom-in/out operation as illustrated in FIG. 16*a*, and five thumbnails are displayed (n=5) in the width direction after the zoom-in/out operation as illustrated in FIG. 16*b*. In this case, when considering changing the display position of a certain thumbnail, for example, the sixteenth thumbnail of all displayed thumbnails (e.g. in the alphabetical order) (the thumbnail represented by "P" in FIGS. 16*a* and 16*b*), this thumbnail is displayed in the fourth line and in the fourth row before the zoom-in/out operation. Then, after the zoom-in/out operation, this thumbnail is located in the fourth line and in the first row. As described above, the thumbnail at the right side of the display section before the zoom-in/out operation is moved to the left side of the display section after the zoom-in/out operation. In this example, the desired thumbnail is displayed in the display section both before and after the zoom-in/out operation. Moreover, if a large number of thumbnails are handled, for example, a desired thumbnail may not be displayed on the display section after a zoom-in/out operation (the desired thumbnail may be excluded from a group of thumbnails that are displayed in the display section). Thereby, a user is likely to lose sight of the desired thumbnail, or the user does not even know whether the desired thumbnail exists within the displayed thumbnail list. These problems are solved by the following image display apparatus and program according to the third embodiment.

(Operation Processing According to the Third Embodiment)

The hardware configuration of the image display apparatus according to the third embodiment is the same as that of the image display apparatus 100 of the first embodiment, and the description thereof is omitted. Hereinafter, operation processing in an image display apparatus 100 according to the third embodiment will be described. The operation processing of this embodiment improves engaging response (adherence) between a zoom-in/out operation and zooming-in/out of the display when thumbnails displayed in a list form are zoomed-in/out. As a result, this operation processing enables the provision of a smooth-feeling interface and it prevents a user from losing a desired thumbnail due to a zoom-in/out operation.

Hereinafter, the operation processing of the embodiment will be described with reference to the explanatory views of FIGS. 17a to 17c, 18a, 18b, 19a, 19b, 20a and 20b and the flow chart of FIG. 21. For ease of description, the following description is based on the case where the thumbnails are at the same size (a square having a side length of t1) and are displayed in list form in a predetermined order (e.g. in the order of the thumbnail numbers illustrated in FIGS. 17a to 17c, 18a, 18b, 19a, 19b, 20a and 20b). However, the present invention is not limited thereto, and is also applicable to cases where thumbnails are at different sizes.

Figure 21:
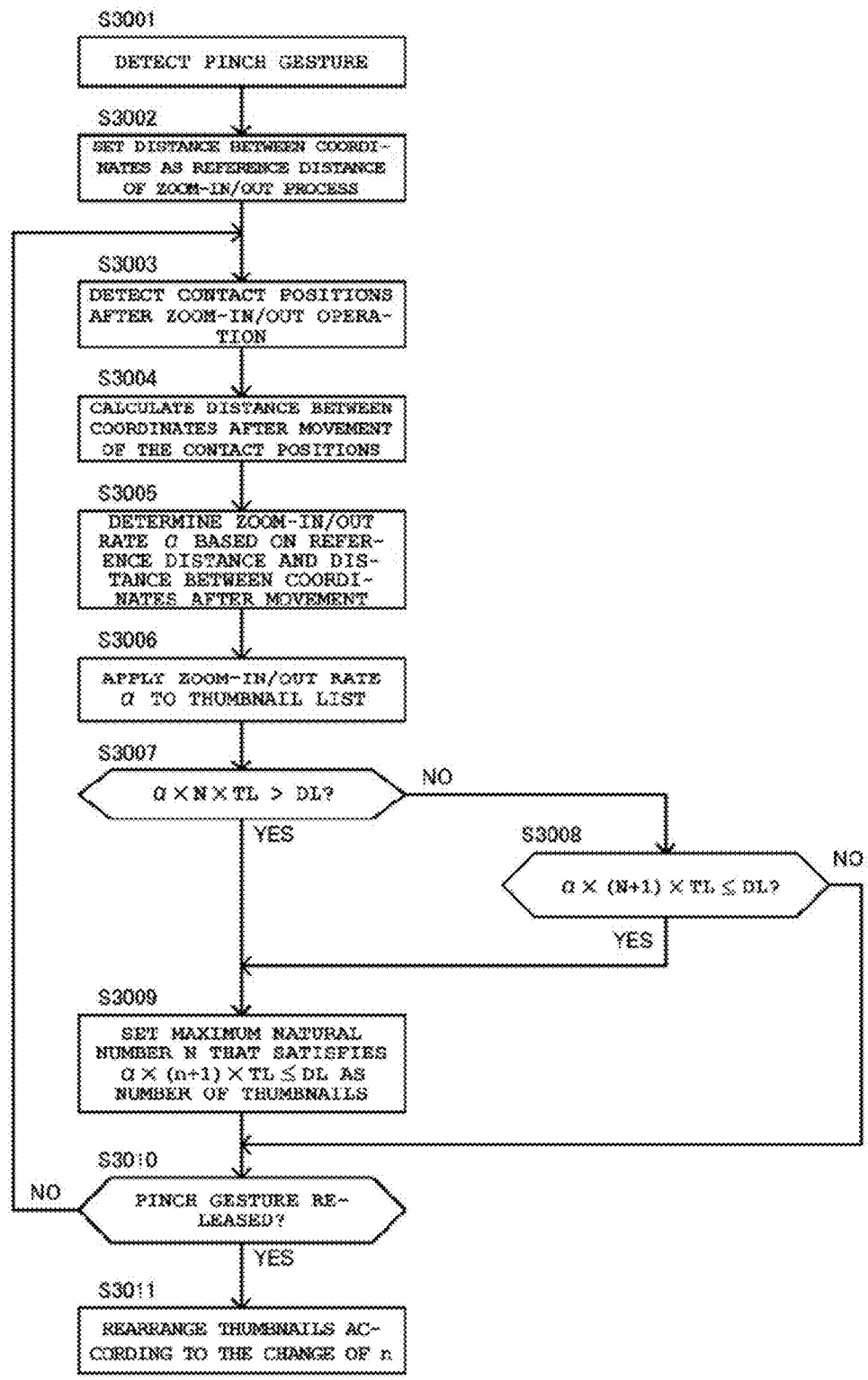
FIG. 21 is a flowchart of a program implemented by the image display apparatus according to the third embodiment.

FIG. 21 is a flow chart illustrating the process according to the embodiment, which is a part of the processes of the programs executed by the control section 101. A user needing to zoom-in/out the thumbnail list in the non-selection mode touches the input section 106 (display section 104) with two fingers to perform a multi-touch gesture, which causes a pinch gesture to be detected (S3001). At the same time, the coordinates of the two fingers on the touch screen are obtained, and the distance between the coordinates is calculated and set as a reference distance of the zooming-in/out process (S3002). If the user needs to zoom in the list, he/she performs a pinch-out gesture, i.e. moves the two fingers to expand the distance between their contact coordinates. If the user needs to zoom out the list display, he/she performs a pinch-in gesture, i.e. moves the two fingers to narrow the distance between their contact coordinates. Then, the apparatus detects the contact positions of the two fingers displaced by the pinch gesture (S3003), and re-calculates the distance between the contact coordinates of the displaced two fingers (S3004).

Next, a zoom-in/out rate $\alpha$ of the thumbnail list is determined based on the reference distance and the re-calculated distance between the coordinates (S3005). The zoom-in/out rate can be calculated by, for example, dividing the distance between the contact coordinates of the displaced two fingers by the reference distance in order to obtain the value of the zoom-in/out rate $\alpha$. If the reference distance is long, a zoom-out operation is highly likely to be performed. Contrarily, if the reference distance is short, a zoom-in operation is highly likely to be performed. Accordingly, if the reference distance is longer than a predetermined value, it may be assumed that only a zoom-out operation will performed, and the zoom-in/out rate may be limited to $\alpha \leq 1$ (the display magnification will not change by a zoom-in operation). Contrarily, if the reference distance is shorter than a predetermined value, it may be assumed that only a zoom-in operation will be performed, and the zoom-in/out rate may be limited to $\alpha \geq 1$ (the display magnification will not change by a zoom-out operation). Once the zoom-in/out rate $\alpha$ is determined, the obtained zoom-in/out rate $\alpha$ is applied to the thumbnail list to zoom-in/out the thumbnail list (S3006). In the embodiment, when the zoom-in/out rate $\alpha$ is applied to perform the zooming-in/out process, the anchor point is set on the midway point between the coordinates designated by the two fingers of the pinch gesture (or on the thumbnail located at the midway point). However, the present invention is not limited thereto, and the anchor point of the zooming-in/out process may be set on the center point of the display area (display section 104) of the touch screen. In this case, the thumbnail list is zoomed-in/out about the center of the display section 104.

In the case of zooming-in, some thumbnails may be located outside of the display area of the display section 104, and thus are not displayed. In the case of zooming-out, vacant space may be formed, which may be sufficient for one or more additional thumbnails. In these cases, the thumbnail list is preferably rearranged, which is performed by the following process.

To determine the arrangement of the thumbnails in the zoomed-in/out list, a comparison is made between the value obtained by multiplying the width of the original list by the obtained zoom-in/out rate, i.e. an expected zoomed-in/out width, and the maximum displayable width of the display section 104 (S3007). In the following description, t1 is the width of each thumbnail, N is the number of thumbnails displayed in the width direction before the zooming-in/out process, n is the number of thumbnails displayed in the width direction after the zooming-in/out process, and DL is the maximum displayable width of the display section 104. In step S3007, if the expected zoomed-in/out width according to a zoom-in operation is longer than the displayable maximum width (S3007, Yes), i.e. if $\alpha \times N \times t1 > DL$ (for ease of description, gaps between thumbnails are not considered), the expected zoomed-in/out width cannot be directly applied as the width of the list and the number of thumbnails in the width direction must be reduced. Therefore, a maximum natural number n that satisfies $\alpha \times n \times t1 \leq DL$ is obtained, and the obtained number is set as the number of thumbnails in the width direction after zooming-in/out (S3009).

In step S3007, if the expected zoomed-in/out width is less than or equal to the displayable maximum width (S3007, No), the number of thumbnails in the width direction is increased by one, and then a comparison is made between the expected zoomed-in/out width and the maximum displayable width of the display section 104 (S3008). That is, a determination is made as to whether the zoom-out operation will make sufficient space for one or more additional thumbnails. In step S3008, if the zoomed-in/out width with the increased number of thumbnails in the width direction by one is less than or equal to the maximum displayable width of the display section 104 (S3008, Yes), i.e. if $\alpha \times (N+1) \times t1 \leq DL$, it means that the zooming-out will make sufficient space for one or more additional thumbnails in the width direction. In this way, a maximum natural number n that satisfies $\alpha \times n \times t1 \leq DL$ is obtained, and is set as the number of thumbnails in the width direction after the zooming-in/out (S3009).

After step S3009 is complete, the process proceeds to step S3010. Meanwhile, in step S3008, if the zoomed-in/out width of the number of thumbnails in the width direction increased by one is longer than the maximum displayable width of the display section 104 (S3008, No), i.e. if the application of the zoom-in/out rate does not change the number of thumbnails in the width direction, the process directly proceeds to step S3010.

In step S3010, a determination is made as to whether the pinch gesture is released, i.e. whether the multi-touch gesture on the input section 106 is released. If the pinch gesture is not released (S3010, No), the process returns to step S3003 without rearranging the thumbnails, and the zoom-in/out rate α is changed according to the continuing pinch gesture of the user. Furthermore, based on the changing zoom-in/out rate α, the display list is dynamically zoomed-in/out, and the number of thumbnails in the width direction is reset as necessary. If the pinch gesture is released (S3010, Yes), the thumbnails are rearranged according to the maximum number of thumbnails displayable in the width direction that has been obtained in step S3009 (S3011). Here, in S3010, whether the pinch gesture is released is determined, but the present invention is not limited thereto. For example, in the case where the multi-touch gesture is maintained but it is determined that an operation by the pinch gesture has not performed for a predetermined period (for example, 5 seconds) or more, that is, it is determined that there has been no pinching input by the pinch gesture or that the amount of pinching input by the pinch gesture was equal to or less than predetermined amount for the predetermined period or more, then the thumbnails may be rearranged as in S3011. In this case, after the rearrangement of the thumbnails as in S3011, if it is determined that there is a movement input by the pinch gesture while the multi-touch gesture is maintained, it is preferable to cancel the rearrangement of the thumbnails and to display the thumbnails in the positions before the rearrangement, and the process returns to S3010.

Figure 17:
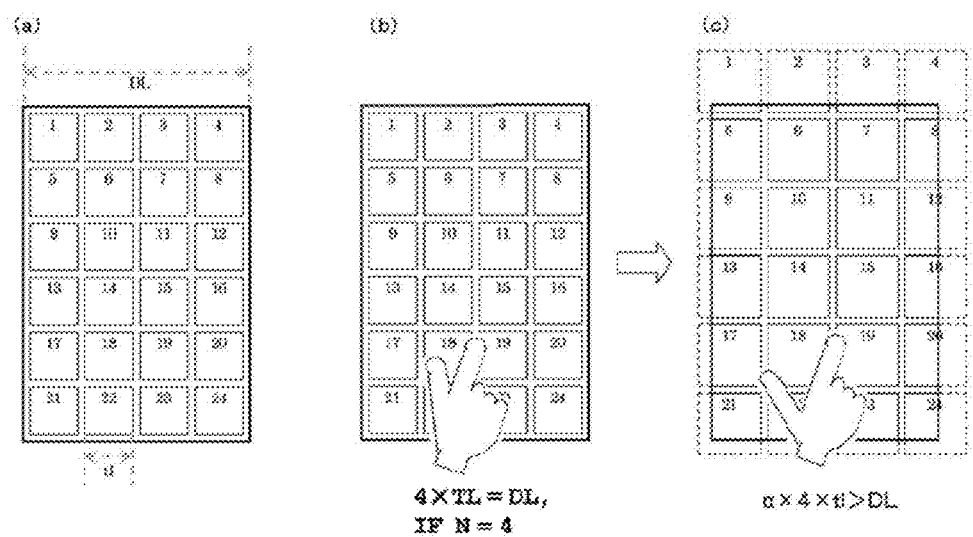
FIGS. 17a to 17c are views for describing a zoom-in/out operation of a thumbnail list as well as animated thumbnail movement in an image display apparatus according the third embodiment.
Figure 18:
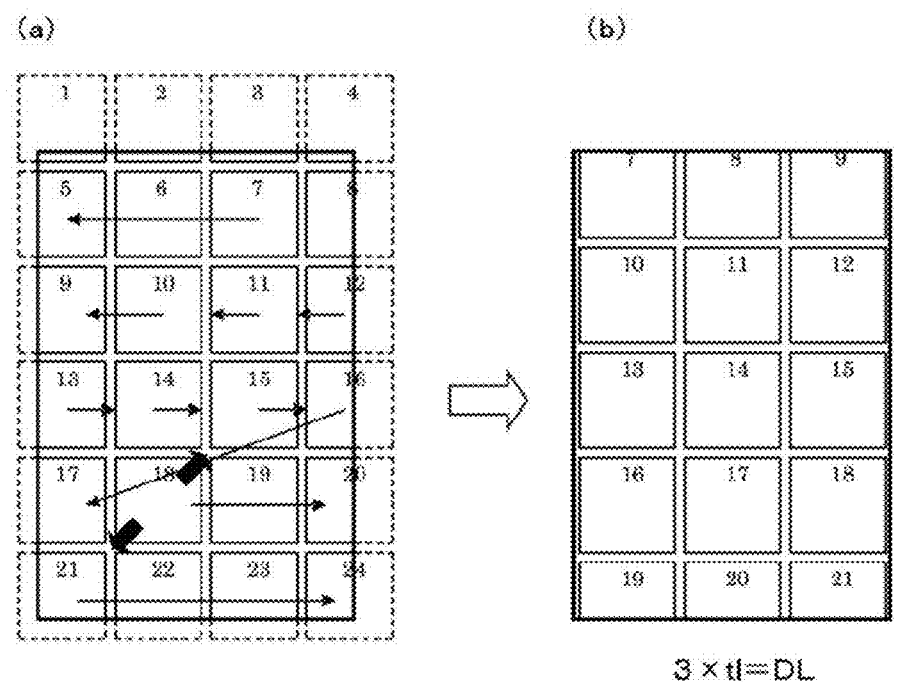
FIGS. 18a to 18b are views for describing a zoom-in/out operation of a thumbnail list as well as animated thumbnail movement in an image display apparatus according the third embodiment.

FIGS. 17a to 17c, 18a and 18b illustrate a specific example. As illustrated in FIGS. 17a and 17b, at the time a pinch gesture is started, the number of thumbnails is four, and the following relation is satisfied: 4×t1=DL (N=4). Then, as illustrated in FIG. 17c, at the time the zoom-in/out operation is complete (at the time the pinch gesture is released), the number of thumbnails has been changed to three, because the relation α×4×t1>DL was true and a maximum natural number n that satisfies α×n×t1≤DL was three. As a result, as illustrated in FIGS. 18a and 18b, the thumbnails are rearranged in three rows in the width direction in the list. In this state, the following relation is satisfied: 3×t1=DL.

Figure 19:
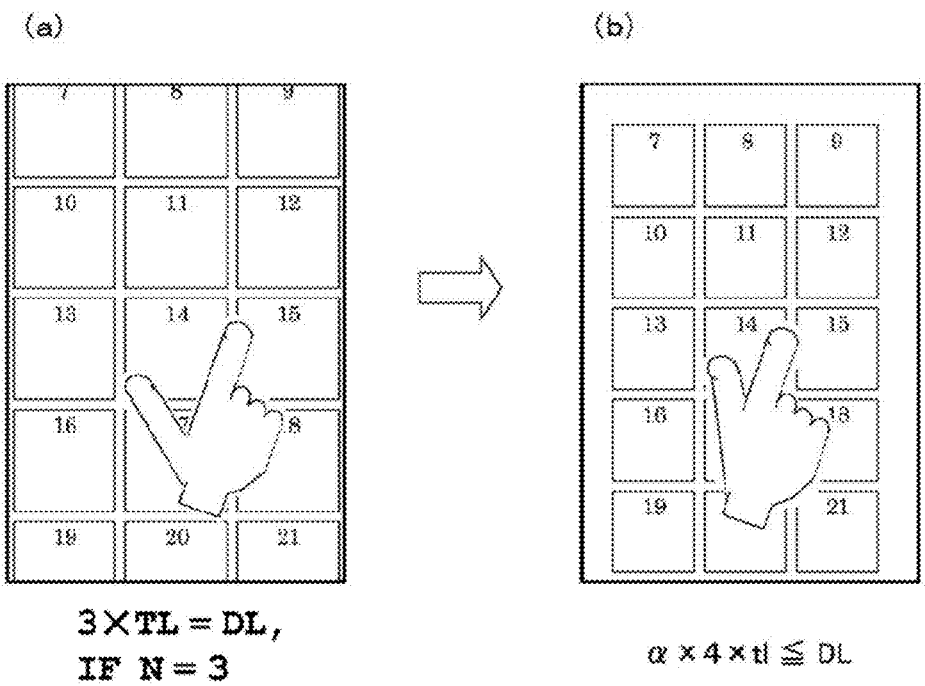
FIGS. 19a to 19b are views for describing a zoom-in/out operation of a thumbnail list as well as animated thumbnail movement in an image display apparatus according the third embodiment.
Figure 20:
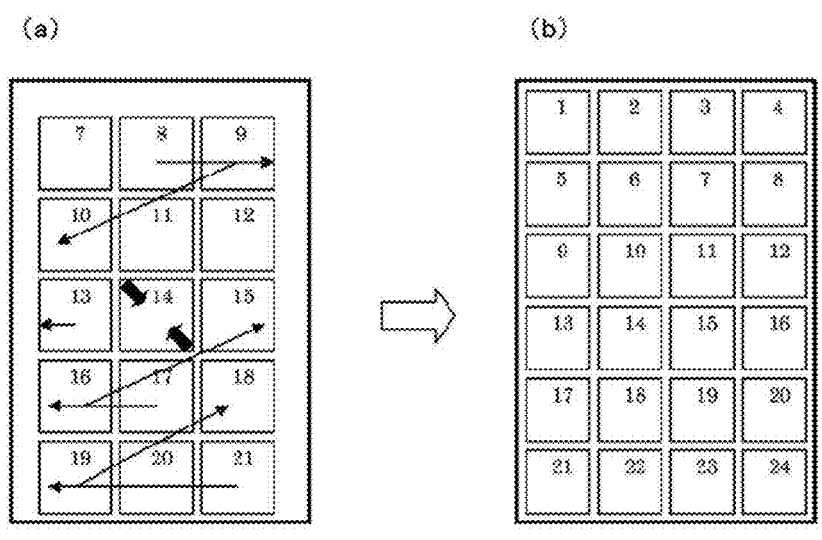
FIGS. 20a to 20b are views for describing a zoom-in/out operation of a thumbnail list as well as animated thumbnail movement in an image display apparatus according the third embodiment.

FIGS. 19a, 19b, 20a and 20b illustrate a specific example. As illustrated in FIG. 19a, at the time a pinch gesture is started, the number of thumbnails is three, and the following relation is satisfied: 3×t1=DL (N=3). Then, as illustrated in FIG. 19b, at the time the zoom-in/out operation is complete (at the time the pinch gesture is released), the number of thumbnails has been changed to four, because the relation α×4×t1≤DL was true and a maximum natural number n that satisfies α×n×t1≤DL was four. As a result, as illustrated in FIGS. 20a and 20b, the thumbnails are arranged in four rows in the width direction in the list. In this state, the following relation is satisfied: 4×t1=DL.

When the thumbnail list is zoomed-in/out according to a pinch gesture as illustrated in the examples of FIGS. 17a to 17c, 18a, 18b, 19a, 19b, 20a and 20b, the relative position among the thumbnails is retained (static) while the pinch gesture is being performed. Then, at the time the pinch gesture is released, the relative position among the thumbnails becomes variable so that the thumbnails are rearranged. This enhances the engaging response (adherence) between a zoom-in/out operation and zooming-in/out the display, which allows for providing a smooth-feeling interface.

In the above embodiment, the thumbnails are rearranged if either relation α×N×t1>DL or α×(N+1)×t1≤DL is true, i.e. if the expected zoomed-in/out width exceeds the maximum displayable width, or if the expected zoomed-in/out width with the number of thumbnails in the width direction increased by one is less than or equal to the displayable maximum width. However, the present invention is not limited thereto. For example, the thumbnails may be rearranged if either relation α×(N−0.5)×t1>DL or α×(N+0.5)×t1≤DL is true, i.e. if half or more of each edge-located thumbnail will be cut off as a result of the zooming-in/out process, or if half or more of each edge-located thumbnail will be displayed as a result of the zooming-in/out even if the number of thumbnails in the width direction is increased by one. This configuration cannot prevent the edge-located thumbnails of the displayed thumbnails from being partly cut off. However, this configuration is advantageous in that a larger number of thumbnails can be displayed compared to the previous case.

In the above-described embodiment, the relative position among the thumbnails is maintained while a pinch gesture is being performed. Then, at the time the pinch gesture is released in step S3010, the relative position among the thumbnails is rearranged. However, the present invention is not limited thereto, and the relative position among the thumbnails may be variable during a zoom-in/out operation.

Next, a display process in step S3011 will be described, where each thumbnail is rearranged at a predetermined position. As mentioned above, the problem for the user is the difficulty of finding the position of a desired thumbnail after a zoom-in/out operation if the thumbnails are rearranged according to the change of n. The following method allows a user to readily find the position of a desired thumbnail.

(Clarification of Position by Means of Animation)

The location to which thumbnails have moved can be clarified by means of an animation that shows the movement of each thumbnail. FIG. 18a is a view illustrating the arrangement of the thumbnails after a zoom-in operation but before rearrangement of the thumbnails, and FIG. 18b is a view illustrating the arrangement of the thumbnails after the rearrangement. Further, FIG. 20a is a view illustrating the arrangement of the thumbnails after a zoom-out operation but before rearrangement of the thumbnails, and FIG. 20b is a view illustrating the arrangement of the thumbnails after the rearrangement.

As illustrated in FIGS. 18a, 18b, 20a and 20b, in response to a change of the number of thumbnails displayable in the width direction according to a pinch gesture, the movement of each thumbnail is illustrated by the arrows in a certain time (e.g. 1 second) after the pinch operation is released. For example, the thumbnail denoted by "16" in FIGS. 18a and 18b is located in the fourth line from the top and the fourth row from the left in the 4×6 two-dimensional list before rearrangement, but it is located in the fourth line from the top and the first row from the left in the 3×5 two-dimensional list after the rearrangement. That is, as illustrated by the arrow, the thumbnail moves from the right end to the left end, and also moves slightly below the original position. Further, the thumbnail denoted by "21" in FIGS. 20a and 20b is located in the fifth line from the top and the third row from the left in the 3×5 two-dimensional list before rearrangement, but it is located in the sixth line from top and the first line from left in the 4×6 two-dimensional list after the rearrangement. That is, as illustrated by the arrow, the thumbnail moves from the right end to the left end. These movements are visualized by way of animation, i.e. by drawing the path of the movements.

As described above, by using an animation to show the movement of each thumbnail when a zoom-in/out operation is performed, a user can readily find the position of a desired thumbnail and does not lose sight of it due to the operation. Furthermore, the thumbnails start to move in step S3011 when a pinch gesture in step S3010 is released, which is advantageous in that a user is less likely to lose sight of a desired thumbnail compared to the case where the thumbnails move during a pinch gesture.

(Clarification of Specific Thumbnails)

Among the thumbnails to be moved, any thumbnails that satisfy a predetermined condition may be displayed in a different style from that of the other thumbnails. The location to which these thumbnails have moved after a zoom-in/out operation can therefore be clarified. These styles may include, for example, a semi-translucent overlay in a predetermined color, a predetermined color frame, lighter or darker brightness settings, an overlay with a predetermined mark, and the like.

Figure 22:
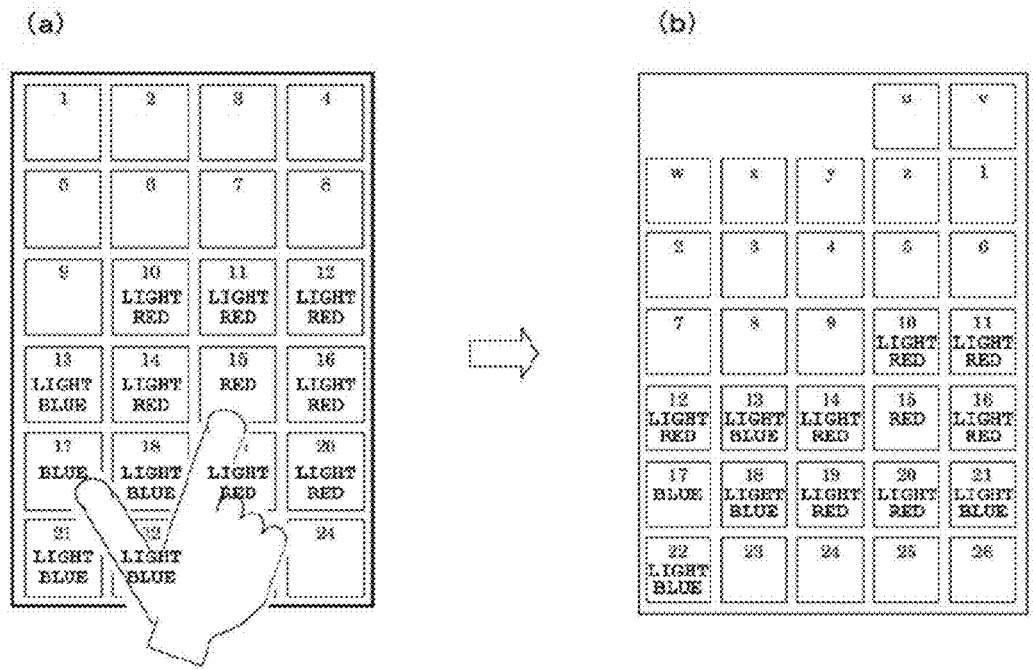
FIGS. 22a and 22b are views for describing that certain thumbnails are identified by different display styles upon the thumbnail movement according to the zoom-in/out operation of the thumbnail list, in the image display apparatus according to the third embodiment.

FIGS. 22a and 22b illustrate an example where a 4×6 thumbnail list is transformed to a 5×7 thumbnail list according to a zoom-in/out operation. In this example, predetermined thumbnails are overlaid with predetermined colors for clarification. Specifically, as illustrated in FIG. 22a, a user performs a multi-touch gesture at the display positions of thumbnails 15 and 17 in the 4×6 thumbnail list with his two fingers. The control section 101 detects the coordinates of the two points designated by the multi-touch gesture, specifies thumbnails 15 and 17 that correspond to the coordinates, and further specifies the thumbnails that are located around the specified thumbnails 15 and 17. Then, the control section 101 overlays these specified thumbnails with predetermined colors.

In the example of FIG. 22a, thumbnail 17 touched by the thumb of the pinch gesture is overlaid with blue, thumbnails 13, 18, 21 and 22 located around thumbnail 17 are overlaid with light blue (sky blue), thumbnail 15 touched by the index finger of the pinch gesture is overlaid with red, and thumbnails 10, 11, 12, 14, 16, 19 and 20 located around thumbnail 15 are overlaid with light red (pink). That is, compared to the overlaid colors of the thumbnails located at the coordinates where the fingers of the pinch gesture touch in the beginning, the surrounding thumbnails are overlaid with similar but lighter or more translucent colors.

After the 4×6 thumbnail list has been transformed to the 5×7 thumbnail list by a pinch-in gesture as illustrated in FIG. 22b, the user can readily track the movement of thumbnail 17, which was touched by the thumb of the pinch gesture, and the surrounding thumbnails from the arrangement of the overlaid colors. Similarly, by means of the arrangement of the overlaid colors, the user can readily track the movement of thumbnail 15, which was touched by the index finger of the pinch gesture, and the surrounding thumbnails. If the pinch gesture is released, the overlay is canceled after a predetermined period of time (e.g. 3 seconds) so that the display mode returns to normal mode. If the thumbnails are rearranged after the pinch gesture is released, the overlay is canceled after a predetermined period of time following completion of the animation so that the display mode returns to the normal mode.

As described above, thumbnails that are included in the coordinates designated by the pinch gesture are overlaid with different colors from each other. Furthermore, each of these thumbnails and the surrounding thumbnails are overlaid with different colors from each other. With this configuration, the user can readily find the location to which these thumbnails have moved due to rearrangement following a zoom-in/out operation. The means of displaying specific thumbnails in a different style is not limited to the above fashion. Other means may include just coloring them with a predetermined color, lighter or darker brightness settings, or an overlay with a predetermined mark.

Figure 23:
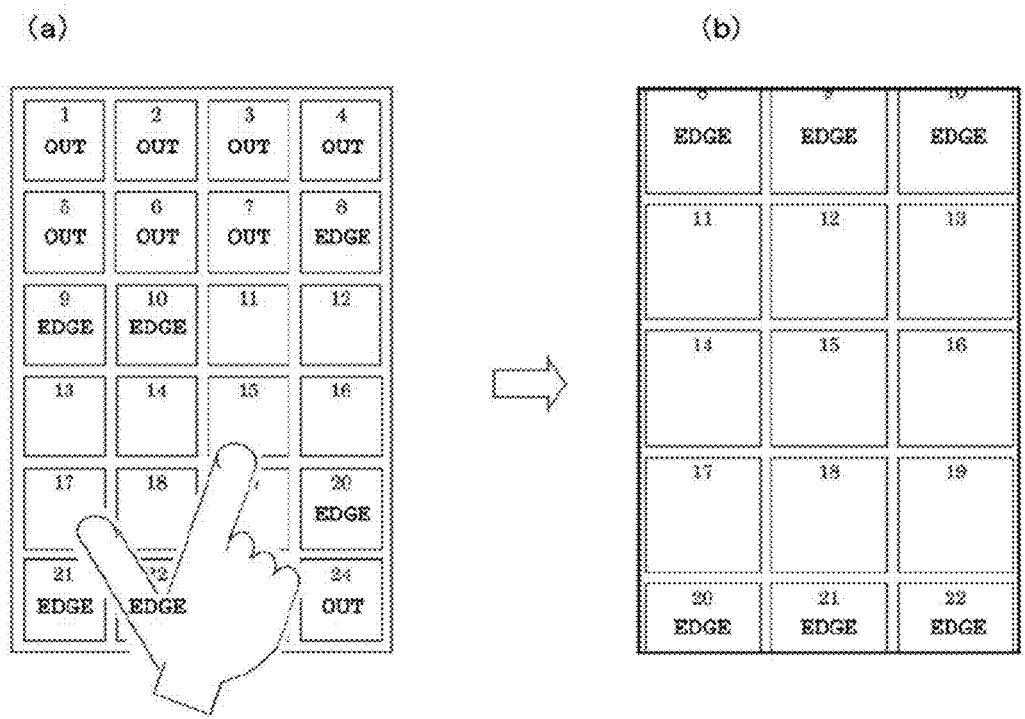
FIGS. 23a and 23b are views for describing that certain thumbnails are identified by different display styles upon the thumbnail movement according to the zoom-in/out operation of the thumbnail list, in the image display apparatus according to the third embodiment.

As illustrated in FIGS. 23a and 23b, thumbnails that will be excluded from the display section 104 in the zoomed-in display due to a decrease of the above-described natural number n as a result of a zoom-in operation are preferably displayed in a distinguishable style in advance of the zooming-in process. As illustrated in FIG. 23a, in the case where the user performs a multi-touch gesture at the positions of thumbnails 15 and 17 (starts a pinch gesture), the control section 101 detects the two coordinates designated by the multi-touch gesture to set the reference point of zooming-in/out. In this case, the midway point between the coordinates of the two fingers (a coordinate included in thumbnail 18) is set as the reference point. The center point for the zooming-in/out process is thus determined.

Once the reference point for zooming-in/out is set, it becomes possible to calculate which thumbnails will be excluded from the display section 104 by zooming-in one level from the current level (decreasing n by one). Thus, these thumbnails are specified. In the example, thumbnails 1 to 7, 23 and 24 (the thumbnails denoted by "out" in the figure) fall into such thumbnails. The control section 101 displays these thumbnails in a style different from the style of the other thumbnails, e.g. with the brightness reduced by 50%. Further, the control section 101 similarly specifies thumbnails that will be located at the upper or lower end after zooming-in. In the example, thumbnails 8 to 10 and 20 to 22 (the thumbnails denoted by "edge" in the figure) fall into such thumbnails. The control section 101 displays these thumbnails in a style different from the style of the other thumbnails, and in a style that also differs from that of the thumbnails to be excluded from the display section 104 (the thumbnails denoted by "out" in the figure), e.g. with the brightness reduced by 25%.

As illustrated in FIG. 23b, thumbnails in such specific styles are thumbnails that will be excluded after zooming-in or thumbnails that, although displayed on the display section 104, will be partly cut off after zooming-in due to their location at the upper or lower end of the displayable area. If the pinch gesture is released, the specific display styles are canceled after a predetermined period of time (e.g. 3 seconds), and the display style returns to a normal style where the brightness is not reduced. If the thumbnails are rearranged after the pinch gesture is released, the display style returns to a normal style after a predetermined period of time following completion of the animation. The means of displaying specific thumbnails in a different style is not limited to the above-described way of altering the brightness levels. Other means may include an overlay with a predetermined color, providing a predetermined color frame, or an overlay with a predetermined mark. Alternatively, a borderline may be drawn along the boundary between, for example, ones that will be entirely displayed, ones that will be partly displayed and ones that will be excluded.

In the above-described example, thumbnails that will be excluded when zooming-in by one level due to a pinch gesture are displayed in a distinguishable style. After the thumbnails that will be excluded by one-level zooming-in are displayed in the distinguishable style, if the user further performs a pinch-out gesture, the zoom-in/out rate α may be re-calculated in response to the pinch-out gesture. Then, in the case where the pinch gesture is released without further operation, if it is determined that zooming-in by two levels will be performed (if it is determined that n will be decreased by two from the value before the pinch-out gesture), the thumbnails that will be excluded by two-level zooming-in may be displayed in an identifiable style. That is, thumbnails that will be excluded by zooming-in may be dynamically determined in response to a pinch-out gesture so that they are displayed in a distinguishable style.

Similarly, thumbnails that will be excluded by three-level, four-level or any-level zooming-in may be displayed in an identifiable style.

As described above, certain thumbnails are displayed in a different style from the style of the other thumbnails while a zoom-in/out operation is being performed, which is advantageous in that the user is less likely to lose sight of a desired thumbnail. Furthermore, the user can find out in advance whether a desired thumbnail will be displayed on the display section after a zoom-in/out operation. Therefore, if the desired thumbnail will be excluded, the user can decide to cancel the zoom-in/out operation. Also, the user can find out in advance whether an additional scroll operation will be required after a zoom-in/out operation.

The above-described embodiments are to illustrate merely an example of the image display apparatus and the like according to the present invention. The image display apparatus and the like according to the present invention shall not be limited to the image display apparatuses and the like of the embodiments, and any changes and modifications may be made in the image display apparatuses and the like of the embodiments without departing from the spirit and scope of the invention. Further, the present invention is applicable to other products.

The above-described process for a display image according to the first embodiment can be performed on the thumbnail lists of the second and third embodiments. The whole thumbnail list displayed on the display section 104 may be handled as a single image to perform the convergences as described in the first embodiment.

The above-described processes for thumbnails according to the second or third embodiment are applicable even if the subject items to be selected or zoomed-in/out are icon images (e.g. application icons and document icons). That is, the processes as described in the second and third embodiments can be performed on not only thumbnails but also on any items displayed on the display section in a list form.

It should be understood that the present invention is not only applicable to the so-called smartphones, but also applicable to cellular phones, tablets and other mobile terminals and to other electronic devices. However, cellular phones including smartphones are the optimal targets of the present invention because they are communications devices that are always carried by users and they usually have an imaging unit.

In the above embodiments, image display programs for performing the image display processes according to the first to third embodiments (the image display process illustrated in the flow chart of FIG. 6, the image display process illustrated in the flow chart of FIG. 12, and the image display process illustrated in the flow chart of FIG. 21) are stored in the memory section 102 of the image display apparatus 100 of FIG. 3, and the control section 101 reads out and executes these image display programs so as to perform the image display processes according to the above-described embodiments. In these cases, it should be understood that the memory section 102 may include a recording medium (external storage) such as memory card (SD card), compact flash card, memory stick, USB memory, CD-RW (optical disk) and MO (magnetooptic disk) in addition to an internal storage such as ROM and hard disk, and the above image display programs and the data used for displaying images may be stored in the recording medium.

Figure 24:
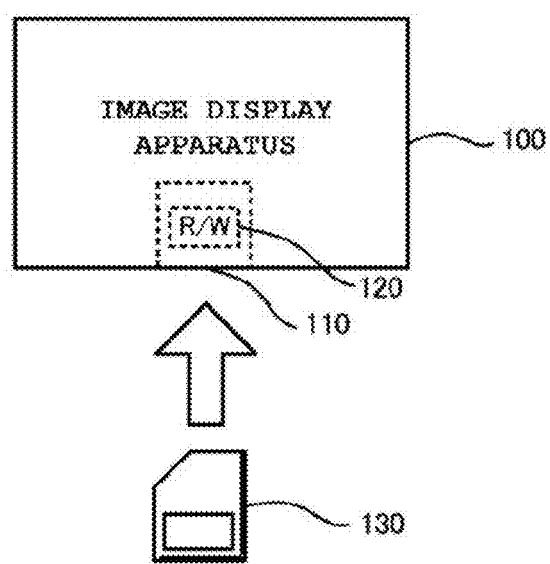
FIG. 24 is a view illustrating an example of a recording medium in which an image processing program is stored.

FIG. 24 is a view illustrating an example of such recording media.

The image display apparatus 100 includes a card slot 110 configured to receive insertion of a memory card 130, and also includes a card reader/writer (R/W) 120 configured to read information stored in the memory card 130 inserted in the card slot 110 or to write information to the memory card 130. The card reader/writer 120 is controlled by the control section 101 so as to write the image displaying programs and the data used for displaying images stored in the memory section 102 to the memory card 130. The image displaying programs and the data used for displaying images thus stored in the memory card 130 are configured such that external apparatuses (e.g. personal computers) besides the image display apparatus 100 can also read them so as to perform the image display processes according to the above-described embodiments in the apparatuses.

REFERENCE SIGNS LIST

100 image display apparatus, 101 control section, 102 memory section, 103 communication section, 104 display section, 105 imaging section, 106 input section, 110 card slot, 120 card reader, 130 memory card.

The invention claimed is:

1. An image display apparatus, comprising:
a touch screen; and
a display control section to display a plurality of display items on the touch screen, and to perform a selection display process on a target display item belonging to a designated area among the plurality of display items,
wherein the designated area is determined based on coordinates of two points designated by a pinch in-out gesture on the touch screen,
the selection display process is to display the target display item in a predetermined selected style,
wherein in response to a change of the coordinates of the pinch in-out gesture after the selection display process has been performed, the display control section performs the selection display process again on the target display items belonging to the designated area that is determined based on the changed coordinates, wherein the target display items included in both of the previous coordinates and the changed coordinates remain to be displayed in the predetermined selected style,
wherein when another coordinate other than the two points is tapped while the selection display process has been performed and the two points designated by the pinch in-out gesture remain on the touch screen, the pinch in-out gesture is transited from a gesture that performs the selection display process to a gesture that performs a non-selection display process which causes the display control section to perform the non-selection display process as to display in a predetermined unselected style all of the target display items belonging to the designated area.

2. The image display apparatus according to claim 1,
wherein in response to a change of the coordinates of the pinch in-out gesture after the non-selection display process has been performed, the display control section performs the non-selection display process again on the target display items belonging to the designated area that is determined based on the changed coordinates, wherein the target display items included in both the changed coordinates and the coordinates immediately prior to the changed coordinates remain to be displayed in the predetermined unselected style, and
wherein when another coordinate other than the two points is tapped while the non-selection display process has been performed and the two points designated by the pinch in-out gesture remain on the touch screen, the pinch in-out gesture is transited from a gesture to perform the selection display process to a gesture to perform the non-selection display process which causes the display control section to perform the selection display process on all of the target display items belonging to the designated area.

3. The image display apparatus according to claim 1,
wherein the plurality of display items comprises a plurality of thumbnails,
there are a selection mode and a non-selection mode as to a state where the plurality of thumbnails are displayed, the selection display process and the non-selection display process according to the pinch in-out gesture are enabled in the selection mode, and a zooming-in/out of the plurality of thumbnails according to a predetermined zoom-in/out operation is enabled in the non-selection mode,
the zoom-in/out operation comprises a pinch gesture by which two points are designated on the touch screen, and
the selection mode and the non-selection mode are switchable to each other according to a predetermined switching operation.

4. The image display apparatus according to claim 3,
wherein the switching operation comprises a long tap at two points on the touch screen for a predetermined period or more of time, and
after transition to the selection mode according to the long tap, the display control section displays a thumbnail belonging to the designated area among the plurality of thumbnails in the selected style, wherein the designated area is determined based on coordinates of the two points of the long tap.

5. An image displaying method, comprising:
when a plurality of display items are displayed on a touch screen, performing a selection display process on a target display item belonging to a designated area among the plurality of items,
wherein the designated area is determined based on coordinates of two points designated by a pinch in-out gesture on the touch screen,
the selection display process is to display the target display item in a predetermined selected style;
wherein in response to a change of the coordinates of the pinch in-out gesture after the selection display process has been performed, performing the selection display process again on the target display items belonging to the designated area that is determined based on the changed coordinates, wherein the target display items included in both of the previous coordinates and the changed coordinates remain to be displayed in the predetermined selected style,
wherein when another coordinate other than the two points is tapped while the selection display process has been performed and the two points designated by the pinch in-out gesture remain on the touch screen, the pinch in-out gesture is transited from a gesture to perform the selection display process to a gesture to perform a non-selection display process which causes performing the non-selection display process as to display in a predetermined unselected style all of the target display items belonging to the designated area.

6. The image displaying method according to claim 5, further comprising:
in response to change of the coordinates of the pinch in-out gesture after the non-selection display process has been performed, performing the non-selection display process again on the target display items belonging to the designated area that is determined based on the changed coordinates, wherein the target display items included in both the changed coordinates and the coordinates immediately prior to the changed coordinates remain to be displayed in the predetermined unselected style, and
wherein when another coordinate other than the two points is tapped while the non-selection display process has been performed and the two points designated by the pinch in-out gesture remain on the touch screen, the pinch in-out gesture is transited from a gesture to perform the selection display process to a gesture to perform the non-selection display process which causes performing the selection display process on all of the target display items belonging to the designated area.

7. The image displaying method according to claim 5,
wherein the plurality of display items comprise a plurality of thumbnails,
there are a selection mode and a non-selection mode as to a state where the plurality of thumbnails are displayed, the selection display process and the non-selection display process according to the pinch in-out gestures are enabled in the selection mode, and a zooming-in/out of the plurality of thumbnails according to a predetermined zoom-in/out operation is enabled in the non-selection mode,
the zoom-in/out operation comprises a pinch gesture by which two points are designated on the touch screen, and
the method further comprises: switching the selection mode and the non-selection mode to each other according to a predetermined switching operation.

8. The image displaying method according to claim 7,
wherein the switching operation comprises a long tap at two points on the touch screen for a predetermined period or more of time, and
the method further comprises: after transition to the selection mode according to the long tap, displaying a thumbnail belonging to the designated area among the plurality of thumbnails in the selected style, wherein the designated area is determined based on coordinates of the two points of the long tap.

9. A non-transitory readable recording medium storing a program to make a computer execute the steps of:
when a plurality of display items are displayed on a touch screen, performing a selection display process on a target display item belonging to a designated area among the plurality of display items,
wherein the designated area is determined based on coordinates of two points designated by a pinch in-out gesture on the touch screen,
the selection display process is to display the target display item in a predetermined selected style;
wherein in response to a change of the coordinates of the pinch in-out gesture after the selection display process has been performed, performing the selection display process again on the target display item belonging to the designated area that is determined based on the changed coordinates, wherein the target display items included in both of the previous coordinates and the changed coordinates remain to be displayed in the predetermined selected style,
wherein when another coordinate other than the two points is tapped while the selection display process has been performed and the two points designated by the pinch in-out gesture remains on the touch screen, the pinch in-out gesture is transited from a gesture to perform the selection display process to a gesture to perform a non-selection display process which causes performing the non-selection display process as to display in a predetermined unselected style all of the target display items belonging to the designated area.

10. The non-transitory readable recording medium storing a program according to claim 9, to make the computer further execute the steps of:

in response to change of the coordinates of the pinch in-out gesture after the non-selection display process is performed, performing the non-selection display process again on the target display items belonging to the designated area that is determined based on the changed coordinates, wherein the target display items included in both the changed coordinates and the coordinates immediately prior to the changed coordinates remain to be displayed in the predetermined unselected style, and wherein when another coordinate other than the two points is tapped while the non-selection display process has been performed and the two points designated by the pinch in-out gesture is on the touch screen, the pinch in-out gesture is transited from a gesture to perform the selection display process to a gesture to perform the non-selection display process which causes performing the selection display process on all of the target display items belonging to the designated area.

11. The non-transitory readable recording medium storing a program according to claim 9, to make the computer further execute the steps of:

wherein the plurality of display items comprise a plurality of thumbnails, there are a selection mode and a non-selection mode as to a state where the plurality of thumbnails are displayed, the selection display process and the non-selection display process according to the pinch in-out gesture are enabled in the selection mode, a zooming-in/out of the plurality of thumbnails according to a predetermined zoom-in/out operation is enabled in the non-selection mode, the zoom-in/out operation comprises a pinch gesture by which two points are designated on the touch screen, and the program further make the computer perform the step of: switching the selection mode and the non-selection mode to each other according to a predetermined switching operation.

12. The non-transitory readable recording medium storing a program according to claim 11, to make the computer further execute the steps of:

wherein the switching operation comprises a long tap at two points on the touch screen for a predetermined period or more of time, and the program further make the computer perform the step of: after transition to the selection mode according to the long tap, displaying a thumbnail belonging to the designated area among the plurality of thumbnails in the selected style, wherein the designated area is determined based on coordinates of the two points of the long tap.

13. An image display apparatus, comprising:
a touch screen; and
a display control section to display a plurality of display items on the touch screen, and to perform a non-selection display process on a target display item belonging to a designated area among the plurality of display items, wherein the designated area is determined based on coordinates of two points designated by a pinch in-out gesture on the touch screen, the non-selection display process is to display the target display item in a predetermined unselected style, wherein in response to a change of the coordinates of the pinch in-out gesture after the non-selection display process has been performed, the display control section performs the non-selection display process again on the target display item belonging to the designated area that is determined based on the changed coordinates, wherein the target display items included in both of the previous coordinates and the changed coordinates remain to be displayed in the predetermined unselected style, wherein when another coordinate other than the two points is tapped while the non-selection display process has been performed and the two points designated by the pinch in-out gesture remains on the touch screen, the pinch in-out gesture is transited from a gesture to perform the non-selection display process to a gesture to perform a selection display process which causes the display control section to perform the selection display process as to display in a predetermined selected style all of the target display items belonging to the designated area.

14. The image display apparatus according to claim 13, wherein in response to change of the coordinates of the pinch in-out gesture after the selection display process has been performed, the display control section performs the selection display process again on the target display items belonging to the designated area that is determined based on the changed coordinates, wherein the target display items included in both the changed coordinates and the coordinates immediately prior to the changed coordinates remain to be displayed in the predetermined selected style, and wherein when another coordinate other than the two points is tapped while the selection display process has been performed and the two points designated by the pinch in-out gesture remain on the touch screen, the pinch in-out gesture is transited from a gesture to perform the selection display process to a gesture to perform the non-selection display process which causes the display control section to perform the non-selection display process on all of the target display items belonging to the designated area.

15. An image displaying method, comprising:
when a plurality of display items are displayed on a touch screen, performing a non-selection display process on a target display item belonging to a designated area among the plurality of items, wherein the designated area is determined based on coordinates of two points designated by a pinch in-out gesture on the touch screen, the non-selection display process is to display the target display item in a predetermined unselected style;

wherein in response to a change of the coordinates of the pinch in-out gesture after the non-selection display process has been performed, performing the non-selection display process again on the target display items belonging to the designated area that is determined based on the changed coordinates, wherein the target display items included in both of the previous coordinates and the changed coordinates remain to be displayed in the predetermined unselected style, wherein when another coordinate other than the two points is tapped while the non-selection display process has been performed and the two points designated by the pinch in-out gesture remain on the touch screen, the pinch in-out gesture is transited from a gesture to perform the non-selection display process to a gesture to perform a selection display process which causes performing the selection display process as to display in a predetermined selected style all of the target display items belonging to the designated area.

16. The image displaying method according to claim 15, further comprising:

in response to change of the coordinates of the pinch in-out gesture after the selection display process has been perform, performing the selection display process again on the target display items belonging to the designated area that is determined based on the changed coordinates, wherein the target display items included in both the changed coordinates and the coordinates immediately prior to the changed coordinates remain to be displayed in the predetermined selected style, and wherein when another coordinate other than the two points is tapped while the selection display process has been performed and the two points designated by the pinch in-out gesture remain on the touch screen, the pinch in-out gesture is transited from a gesture to perform the selection display process to a gesture to perform the non-selection display process which causes performing the non-selection display process on all of the target display items belonging to the designated area.

17. A non-transitory readable recording medium storing a program to make a computer execute the steps of:

when a plurality of display items are displayed on a touch screen, performing a non-selection display process on a target display item belonging to a designated area among the plurality of items, wherein the designated area is determined based on coordinates of two points designated by a pinch in-out gesture on the touch screen, the non-selection display process is to display the target display item in a predetermined unselected style;

wherein in response to a change of the coordinates of the pinch in-out gesture after the non-selection display process has been performed, performing the non-selection display process again on the target display item belonging to the designated area that is determined based on the changed coordinates, wherein the target display items included in both of the previous coordinates and the changed coordinates remain to be displayed in the predetermined unselected style, wherein when another coordinate other than the two points is tapped while the non-selection display process has been performed and the two points designated by the pinch in-out gesture remain on the touch screen, the pinch in-out gesture is transited from a gesture to perform the non-selection display process to a gesture to perform a selection display process which causes perform the selection display process as to display in a predetermined selected style all of the target display items belonging to the designated area.

18. The non-transitory readable recording medium storing a program according to claim 17, to make the computer further execute the steps of:

in response to change of the coordinates of the pinch in-out gesture after the selection display process has been performed, performing the selection display process again on the target display items belonging to the designated area that is determined based on the changed coordinates, wherein the target display items included in both the changed coordinates and the coordinates immediately prior to the changed coordinates remain to be displayed in the predetermined selected style, and wherein when another coordinate other than the two points is tapped while the selection display process has been performed and the two points designated by the pinch in-out gesture remain on the touch screen, the pinch in-out gesture is transited from a gesture to perform the selection display process to a gesture to perform the non-selection display process which causes performing the non-selection display process on all of the target display items belonging to the designated area.

* * * * *